United States Patent
Tsukui et al.

(10) Patent No.: US 11,623,351 B2
(45) Date of Patent: Apr. 11, 2023

(54) BAG-SHAPED ACTUATOR SYSTEM, GRIPPING DEVICE USING THE SAME, ROBOTIC HAND, AND USAGE METHOD OF ROBOTIC HAND

(71) Applicant: TOYOTA JIDOSHA KABUSHIKI KAISHA, Toyota (JP)

(72) Inventors: Akira Tsukui, Nagoya (JP); Masaki Koike, Nagoya (JP); Koichi Tanihara, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 329 days.

(21) Appl. No.: 17/036,241

(22) Filed: Sep. 29, 2020

(65) Prior Publication Data
US 2021/0138662 A1    May 13, 2021

(30) Foreign Application Priority Data
Nov. 12, 2019   (JP) .............................. JP2019-204975

(51) Int. Cl.
  *B25J 15/00*   (2006.01)
  *B25J 13/08*   (2006.01)
  (Continued)

(52) U.S. Cl.
  CPC ......... *B25J 15/0023* (2013.01); *B25J 9/1612* (2013.01); *B25J 9/1633* (2013.01);
  (Continued)

(58) Field of Classification Search
  CPC .... B25J 15/0023; B25J 9/1612; B25J 9/1633; B25J 9/1674; B25J 13/082; B25J 13/085;
  (Continued)

(56) References Cited

U.S. PATENT DOCUMENTS

| | | | |
|---|---|---|---|
| 2008/0312769 A1 | 12/2008 | Sato et al. | |
| 2020/0055197 A1* | 2/2020 | Chavan Dafle | B25J 15/0023 |
| 2020/0206948 A1* | 7/2020 | Olivier | B25J 15/103 |
| 2020/0215702 A1 | 7/2020 | Takahashi et al. | |
| 2021/0053218 A1* | 2/2021 | Satou | B25J 9/1633 |
| 2021/0122063 A1* | 4/2021 | Tadakuma | B25J 15/0023 |

FOREIGN PATENT DOCUMENTS

| | | |
|---|---|---|
| JP | H08294885 A | 11/1996 |
| JP | 2002018765 A | 1/2002 |

(Continued)

*Primary Examiner* — Adam R Mott
*Assistant Examiner* — Matthew C Gammon
(74) *Attorney, Agent, or Firm* — Dickinson Wright, PLLC

(57) ABSTRACT

A bag-shaped actuator system includes: a bag-shaped actuator including an airtight bag member and flowable particulates filled in the bag member; a bag-member communication pipe configured to communicate with an inside of the bag member; a low-air-pressure-source communication pipe configured to communicate with a low air pressure source; a high-air-pressure-source communication pipe configured to communicate with a high air pressure source; a switching mechanism configured to perform switching between communication destinations of the bag member such that the inside of the bag member communicates with any of external air, the low-air-pressure-source communication pipe, and the high-air-pressure-source communication pipe via the bag-member communication pipe; and a switching controlling portion configured to control the switching between the communication destinations by the switching mechanism.

7 Claims, 15 Drawing Sheets

(51) Int. Cl.
 *B25J 9/16* (2006.01)
 *B25J 9/20* (2006.01)

(52) U.S. Cl.
 CPC ............... *B25J 9/1674* (2013.01); *B25J 9/20* (2013.01); *B25J 13/082* (2013.01); *B25J 15/0004* (2013.01); *B25J 13/085* (2013.01)

(58) Field of Classification Search
 CPC ........ B25J 15/0253; B25J 15/08; B25J 18/00; B25J 19/0025; B25J 19/02; B25J 9/142; B25J 15/0004; B25J 9/20; G05B 2219/39489; G05B 2219/36529
 See application file for complete search history.

(56) References Cited

FOREIGN PATENT DOCUMENTS

| | | | |
|---|---|---|---|
| JP | 2003305678 | A | 10/2003 |
| JP | 2008307634 | A | 12/2008 |
| JP | 2010012581 | A | 1/2010 |
| JP | 2011230260 | A | 11/2011 |
| JP | 2014008583 | A | 1/2014 |
| JP | 2014205207 | A | 10/2014 |
| JP | 2019058981 | A | 4/2019 |
| JP | 2019166589 | A | 10/2019 |
| WO | 2011135450 | A1 | 11/2011 |
| WO | 2012093932 | A2 | 7/2012 |
| WO | 2014001866 | A2 | 1/2014 |

\* cited by examiner

BAG-SHAPED ACTUATOR SYSTEM, GRIPPING DEVICE USING THE SAME, ROBOTIC HAND, AND USAGE METHOD OF ROBOTIC HAND

INCORPORATION BY REFERENCE

The disclosure of Japanese Patent Application No. 2019-204975 filed on Nov. 12, 2019 including the specification, drawings and abstract is incorporated herein by reference in its entirety.

BACKGROUND

1. Technical Field

The present disclosure relates to a bag-shaped actuator system configured to actuate a bag-shaped actuator, a gripping device using the bag-shaped actuator system, a robotic hand including the gripping device, and a usage method of the robotic hand.

2. Description of Related Art

There have been known a bag-shaped actuator, a gripping device configured to grip a workpiece by use of the bag-shaped actuator, and a method of gripping a workpiece by use of the gripping device (see Japanese Unexamined Patent Application Publication No. 2011-230260 (JP 2011-230260 A), Japanese Unexamined Patent Application Publication No. 2014-8583 (JP 2014-8583 A)). For example, a bag-shaped actuator (an abutment portion 6) in JP 2011-230260 A is provided in each of clamping portions 4b, 5b in lug portions 4, 5, the clamping portions 4b, 5b being configured to clamp a workpiece 50, so that the bag-shaped actuator serves as the abutment portion 6 that abuts with the workpiece 50. The bag-shaped actuator includes an inner package 11 made of an elastic material, and particulates 12 filled in the inner package 11. The bag-shaped actuator (the abutment portion 6) depressurizes the inside of the inner package 11 and hardens the particulates 12 while the particulates 12 are maintained in a given shape, so that the abutment portion 6 has a shape that fits the workpiece 50. Then, the workpiece 50 is clamped and held by the clamping portions 4b, 5b of the lug portions 4, 5, via the abutment portions 6 (see Abstract, paragraphs (0057) to (0074), FIGS. 15, 17 in JP 2011-230260 A).

As such, the bag-shaped actuators (the abutments 6) hold the workpiece 50 by properly using a state where the inside of the inner package 11 is set to the atmospheric pressure so that the particulates 12 are flowable and a state where the inside of the inner package 11 is depressurized so that the particulates 12 are hardened while the particulates 12 are maintained in a given shape.

SUMMARY

However, in addition to a case where the bag-shaped actuators are used such that, after the bag-shaped actuators are deformed in accordance with the shape of the workpiece to be gripped, respective insides of the inner packages are depressurized so that the bag-shaped actuators are hardened, there is such a case where the workpiece is elastically pressed by use of the bag-shaped actuators or the workpiece is to be moved by use of the bag-shaped actuators.

The present disclosure is accomplished in view of such a problem, and an object of the present disclosure is to provide a bag-shaped actuator system that can achieve three states of a bag-shaped actuator, i.e., an "elastically deformable state," a "soft and easily inelastically deformable state," and a "hard and non-deformable state." Further, the present disclosure is to provide a gripping device using the bag-shaped actuator system, a robotic hand including the gripping device, and a usage method of the robotic hand.

(1) One aspect of the present disclosure to achieve the above object is a bag-shaped actuator system including a bag-shaped actuator, a bag-member communication pipe, a low-air-pressure-source communication pipe, a high-air-pressure-source communication pipe, a switching mechanism, and a switching controlling portion. The bag-shaped actuator includes an airtight bag member made of a film material having a flexibility, and flowable particulates filled in the bag member. The bag-member communication pipe is configured to communicate with an inside of the bag member of the bag-shaped actuator. The low-air-pressure-source communication pipe is configured to communicate with a low air pressure source having an air pressure lower than external air. The high-air-pressure-source communication pipe is configured to communicate with a high air pressure source having an air pressure higher than the external air. The switching mechanism is configured to perform switching between communication destinations for the bag member of the bag-shaped actuator such that the inside of the bag member communicates with any of the external air, the low-air-pressure-source communication pipe, and the high-air-pressure-source communication pipe via the bag-member communication pipe. The switching controlling portion is configured to control the switching between the communication destinations by the switching mechanism.

In the bag-shaped actuator system, the inside of the bag member filled with the particulates can switchably communicate with any of the external air, the low-air-pressure-source communication pipe, and the high-air-pressure-source communication pipe via the bag-member communication pipe.

In a case where the inside of the bag member communicates with the external air via the bag-member communication pipe, when a workpiece abuts with the bag-shaped actuator (the bag member) and a force is applied to the bag-shaped actuator (the bag member), the bag member is easily deformed, so that the particulates filled in the bag member flow. Hereby, the whole bag-shaped actuator can be easily deformed.

In the meantime, in a case where the inside of the bag member communicates with the low-air-pressure-source communication pipe via the bag-member communication pipe, the inside of the bag member is depressurized by the low air pressure source communicating with the low-air-pressure-source communication pipe, so that the bag member is pressed by an atmospheric pressure outside the bag member. On this account, the particulates filled in the bag member are compressed, so that the particulates make close contact with each other and become hard to flow. Accordingly, the bag-shaped actuator cannot be easily deformed.

In the meantime, in a case where the inside of the bag member communicates with the high-air-pressure-source communication pipe via the bag-member communication pipe, the bag member is pressurized from inside by the high air pressure source communicating with the high-air-pressure-source communication pipe, so that the bag member is inflated like a balloon. Hereby, the workpiece or the like with which the bag member abuts can be elastically pressed, or the workpiece or the like with which the bag member abuts can be moved by a pressing force from the bag-shaped actuator (the bag member). Alternatively, the workpiece can be elastically gripped.

That is, the bag-shaped actuator system in the present aspect is a system that can achieve three states of the bag-shaped actuator, i.e., an "elastically deformable state (at the time of communicating with the high-air-pressure-source communication pipe," a "soft and easily inelastically deformable state (at the time of communicating with the external air)," and a "hard and non-deformable state (at the time of communicating with the low-air-pressure-source communication pipe)."

The bag-shaped actuator system can employ various usage methods, but the bag-shaped actuator system can be used in the following manner, for example. That is, in a state where the inside of the bag member communicates with the external air, when the bag-shaped actuator is brought into contact with the workpiece or the like, the bag-shaped actuator can be easily deformed to follow the shape of the workpiece or the like with which the bag-shaped actuator abuts.

In view of this, in a state where the inside of the bag member temporarily communicates with the external air, the bag-shaped actuator is brought into contact with the workpiece or the like, so that the bag-shaped actuator has a shape along the workpiece or the like. After that, in a case where the switching mechanism is controlled such that the inside of the bag member communicates with the low-air-pressure-source communication pipe so as to be depressurized, the bag-shaped actuator keeps the shape along the shape of the workpiece or the like with which the bag-shaped actuator abuts, and the bag-shaped actuator enters a non-deformable state. Accordingly, for example, in a gripping device to which the bag-shaped actuator system is applied, it is possible to grip the workpiece or the like appropriately by use of the bag-shaped actuator deformed to follow the shape of the workpiece or the like.

Further, in a state where the inside of the bag member temporarily communicates with the external air, the bag-shaped actuator is brought into contact with the workpiece or the like, so that the bag-shaped actuator has a shape along the workpiece or the like. After that, the switching mechanism is controlled such that the inside of the bag member communicates with the high-air-pressure-source communication pipe so as to be pressurized. In this case, the workpiece or the like with which the bag-shaped actuator abuts can be elastically pressed by the bag-shaped actuator. Alternatively, the workpiece or the like with which the bag-shaped actuator abuts can be moved by being elastically pressed by the bag-shaped actuator. Accordingly, for example, the gripping device to which the bag-shaped actuator is applied can grip the workpiece or the like while the workpiece or the like is elastically pressed, and the gripping device can move the workpiece or the like with which the bag-shaped actuator abuts by pressing the workpiece or the like.

Examples of a film material having a flexibility and constituting the airtight bag member in the bag-shaped actuator may include, for example, rubber materials having elasticity and airtightness such as natural rubber and synthetic rubber, e.g., styrene butadiene rubber, nitrile rubber, fluororubber, and silicone rubber, films made of synthetic resin such as polyethylene, polypropylene, polyamide, polyimide, and polytetrafluoro-ethylene, composite materials made of a synthetic resin film and a metal film such as an aluminum foil, and so on.

Further, examples of the flowable particulates filled in the bag member may include sand, salt particles, sugar particles, alumina particles, ceramic particles such as silica particles, glass particles, synthetic resin particles (pellets), foaming resin particles such as styrene foam particles, metal particles such as iron particles, aluminum particles, and copper particles, and mixtures thereof.

Further, the bag-shaped actuator can be configured such that the bag member is directly brought into contact with the workpiece, but the bag-shaped actuator may be configured such that an outside of the bag member is covered with an outer bag member serving as an outer cover similarly to JP 2011-230260 A and so on.

The low air pressure source should have a mechanism that can depressurize the inside of the bag member of the bag-shaped actuator via the low-air-pressure-source communication pipe so that the pressure inside the bag member becomes lower than the external air (the atmospheric pressure). For example, the low air pressure source may be a vacuum pump or a vacuum tank connected to a vacuum pump.

The high air pressure source should have a mechanism that can pressurize the inside of the bag member of the bag-shaped actuator via the high-air-pressure-source communication pipe so that the pressure inside the bag member becomes higher than the external air (the atmospheric pressure). Examples of the high air pressure source may include a compressor, a compressor including a high-pressure gas reserve tank, a high-pressure gas reserve tank connected to a compressor, a factory air pipe, a high-pressure gas cylinder such as a compressed air cylinder or a nitrogen gas cylinder, and so on. Depending on the air pressure of gas in the high air pressure source, a pressure-adjusting member such as a pressure regulator (a pressure controller) may be provided in the high-air-pressure-source communication pipe. Further, the switching mechanism is a mechanism configured to switch the bag-member communication pipe by a control such that the bag-member communication pipe switchably communicates with any of the low-air-pressure-source communication pipe, the high-air-pressure-source communication pipe, and the external air. The switching mechanism may be, for example, a four-direction switching electromagnetic valve connected to the low-air-pressure-source communication pipe, the high-air-pressure-source communication pipe, the external air, and the bag-member communication pipe. Further, the switching mechanism may use a plurality of switching electromagnetic valves to control the bag-member communication pipe such that the bag-member communication pipe communicates with any of the low-air-pressure-source communication pipe, the high-air-pressure-source communication pipe, and the external air.

(2) Another aspect of the present disclosure is a gripping device using a bag-shaped actuator system. The gripping device includes a gripping mechanism including a plurality of gripping members, the gripping mechanism being configured to grip a workpiece by moving at least any of the gripping members. The gripping device includes at least one bag-shaped actuator system described in (1). The gripping members include respective abutment gripping portions configured to grip the workpiece by abutting with the workpiece. At least any of the abutment gripping portions is constituted by the bag-shaped actuator in the bag-shaped actuator system.

In the gripping device, at least any of the abutment gripping portions of the gripping mechanism is constituted by the bag-shaped actuator in the bag-shaped actuator system. In the meantime, as described above, the bag-shaped actuator system can achieve the three states of the bag-shaped actuator, i.e., the "elastically deformable state (at the time of communicating with the high-air-pressure-source communication pipe," the "soft and easily inelastically deformable state (at the time of communicating with the external air)," and the "hard and non-deformable state (at the time of communicating with the low-air-pressure-source communication pipe)."

On this account, the gripping device can bring the abutment gripping portion constituted by the bag-shaped actuator into contact with the workpiece to be gripped by selecting any of three states, i.e., an "elastically deformable abutment state," a "soft and easily inelastically deformable abutment state," and a "hard and non-deformable abutment state." This can further increase the degree of freedom of a gripping state of the workpiece by the abutment gripping portions of the gripping members and achieve more appropriate gripping of the workpiece.

In addition, in a state where the inside of the bag member is caused to temporarily communicate with the external air, the bag-shaped actuator is brought into contact with the workpiece so that the bag-shaped actuator has a shape along the workpiece, and after that, the switching mechanism is controlled such that the inside of the bag member is depressurized. This makes it possible to firmly grip the workpiece (in a state where a gripped posture of the workpiece cannot be deformed) by use of the non-deformable abutment gripping portion (the bag-shaped actuator) deformed in the shape along the workpiece.

Alternatively, in a state where the inside of the bag member is caused to temporarily communicate with the external air, the bag-shaped actuator is brought into contact with the workpiece or the like, so that the bag-shaped actuator has a shape along the workpiece or the like. After that, the switching mechanism is controlled such that the inside of the bag member communicates with the high-air-pressure-source communication pipe so as to be pressurized so that the bag member is inflated. In this case, the workpiece with which the bag-shaped actuator (the bag member) abuts can be elastically pressed by the bag-shaped actuator (the bag member). Alternatively, the workpiece with which the bag-shaped actuator abuts can be moved by being elastically pressed by the bag-shaped actuator. Accordingly, in the gripping device, the workpiece can be softly gripped (in a state where the gripped posture of the workpiece is easily deformable) while the workpiece is elastically pressed by the abutment gripping portion (the bag-shaped actuator), or the workpiece with which the abutment gripping portion (the bag-shaped actuator) abuts can be moved by pressing the workpiece.

(3) The gripping device described in (2) may be configured such that: the number of bag-shaped actuator systems provided in the gripping device is equal to or more than the number of gripping members; and the abutment gripping portions of the gripping members are constituted by respective bag-shaped actuators of the bag-shaped actuator systems.

In the gripping device, all the abutment gripping portions are constituted by the bag-shaped actuators of the bag-shaped actuator systems. On this account, any of the abutment gripping portions can select any of the above three states, thereby further increasing the degree of freedom of the gripping state of the workpiece by the gripping member and achieving more appropriate gripping.

(4) Further another aspect of the present disclosure is a gripping device using a bag-shaped actuator system. The gripping device includes a gripping mechanism including a plurality of gripping members, the gripping mechanism being configured to grip a workpiece by moving at least any of the gripping members. The gripping device includes a plurality of bag-shaped actuator systems described in (1). The gripping members include respective abutment gripping portions configured to grip the workpiece by abutting with the workpiece. At least any of the gripping members is configured such that the abutment gripping portion and a base-end-side abutment portion are constituted by respective bag-shaped actuators of the bag-shaped actuator systems. The base-end-side abutment portion is placed closer to a base end side than the abutment gripping portion, the base-end-side abutment portion being configured to abut with the workpiece from the base end side of the at least any of the gripping members.

In the gripping device, at least any of the gripping members of the gripping mechanism includes the abutment gripping portion and the base-end-side abutment portion each constituted by the bag-shaped actuator of the bag-shaped actuator system. As described above, the bag-shaped actuator system can achieve the three states of the bag-shaped actuator, i.e., the "elastically deformable state (at the time of communicating with the high-air-pressure-source communication pipe," the "soft and easily inelastically deformable state (at the time of communicating with the external air)," and the "hard and non-deformable state (at the time of communicating with the low-air-pressure-source communication pipe)."

On this account, the gripping device can bring the abutment gripping portion constituted by the bag-shaped actuator into contact with the workpiece to be gripped, in an abutment state selected from three stages, i.e., the "elastically deformable abutment state," the "soft and easily inelastically deformable abutment state," and the "hard and non-deformable abutment state." This can further increase the degree of freedom of the gripping state of the workpiece by the abutment gripping portions of the gripping members and to achieve more appropriate gripping of the workpiece.

Besides, in the gripping device, at least any of the gripping members includes, in addition to the abutment gripping portion constituted by the bag-shaped actuator, the base-end-side abutment portion constituted by the bag-shaped actuator and placed closer to the base end side than the abutment gripping portion, the base-end-side abutment portion being configured to abut with the workpiece from the base end side of the gripping member. On this account, by bringing the base-end-side abutment portion (the bag-shaped actuator) into any of the three states, it is possible to further increase the degree of freedom of the gripping state of the workpiece and to achieve more appropriate gripping of the workpiece.

Further, in the gripping device, the base-end-side abutment portion included in at least any of the gripping members abuts with the workpiece from the base end side of the gripping member. Accordingly, in a state where the inside of the bag member of the bag-shaped actuator constituting the base-end-side abutment portion is caused to communicate with the external air, the base-end-side abutment portion (the bag-shaped actuator) is brought into contact with the workpiece or the like, so that the base-end-side abutment portion (the bag-shaped actuator) has a shape along the workpiece or the like. After that, the switching mechanism is controlled such that the inside of the bag member communicates with the high-air-pressure-source communication pipe so as to be pressurized so that the bag member is inflated, and in this state, the base-end-side abutment portion can be caused to elastically press the workpiece with which the base-end-side abutment portion abuts or move the workpiece by pressing.

(5) The gripping device described in (4) may be configured such that: the number of bag-shaped actuator systems provided in the gripping device is twice or more of the number of gripping members; and respective abutment gripping portions and respective base-end-side abutment portions of the gripping members are constituted by respective bag-shaped actuators of the bag-shaped actuator systems.

In the gripping device, all the gripping members include respective abutment gripping portions and respective base-end-side abutment portions each constituted by the bag-shaped actuator.

On this account, the gripping device uses, for the workpiece to be gripped, the abutment gripping portions and the base-end-side abutment portions each constituted by the bag-shaped actuator, so that it is possible to further increase the degree of freedom of the gripping state of the workpiece and to achieve more appropriate gripping of the workpiece.

(6) Further another aspect of the present disclosure is a robotic hand including: a robotic hand body; the gripping mechanism of the gripping device described in (2) or (3), the gripping mechanism being placed in a distal end portion of the robotic hand body; and a force sensor configured to detect an external force applied to the gripping mechanism.

The robotic hand includes the force sensor. Accordingly, when a predetermined process is performed on the workpiece such that the workpiece is gripped by the gripping mechanism, moved by the robotic hand body, and inserted into an insertion hole of an insertion target member, an external force applied to the workpiece gripped by the gripping members can be detected by the force sensor via the gripping mechanism. On this account, when an abnormal external force is applied to the workpiece in the middle of a process of insertion into the insertion hole due to an inappropriate gripping posture of the workpiece, the process operation can be stopped. Thus, troubleshooting processing on the workpiece can be performed.

(7) The robotic hand described in (6) may be configured such that the force sensor is a six-axis force sensor placed between the robotic hand body and the gripping mechanism.

The robotic hand includes the six-axis force sensor as the force sensor. Accordingly, when a predetermined process is performed on the workpiece, it is possible to more accurately detect an external force applied to the gripping mechanism via the workpiece or the like by breaking down the external force to respective axes.

Note that the six-axis force sensor is a sensor placed between the robotic hand body and the gripping mechanism and configured to detect translational forces in three directions of X, Y, and Z that are translational directions and moments in three directions of Rx, Ry, and Rz that are rotation directions around respective axes.

(8) Further another aspect of the present disclosure is a robotic hand including: a robotic hand body; the gripping mechanism of the gripping device described in (4) or (5), the gripping mechanism being placed in a distal end portion of the robotic hand body; and a force sensor configured to detect an external force applied to the gripping members of the gripping mechanism.

The robotic hand also includes the force sensor. Accordingly, when a predetermined process is performed on the workpiece such that the workpiece is gripped by the gripping mechanism and moved by the robotic hand body, an external force applied to the workpiece gripped by the gripping members can be detected by the force sensor via the gripping device. On this account, when an abnormal external force is applied to the workpiece due to an inappropriate gripping posture of the workpiece, the process operation can be stopped. Thus, an abnormality in the process on the workpiece can be detected appropriately.

Besides, in the robotic hand, the abutment gripping portion of the gripping member in the gripping mechanism is constituted by the bag-shaped actuator. Accordingly, it is possible to perform a flexible process on the workpiece by properly using the above three abutment states. In addition, in the robotic hand, at least any of the gripping members includes the base-end-side abutment portion constituted by the bag-shaped actuator. Accordingly, it is possible to perform a further flexible process on the workpiece by properly using the above three abutment states for the base-end-side abutment portion. The further flexible process is, for example, rotating of the workpiece, or the like.

(9) The robotic hand described in (8) may be configured such that the force sensor is a six-axis force sensor placed between the robotic hand body and the gripping mechanism.

The robotic hand also includes the six-axis force sensor as the force sensor. Accordingly, when a predetermined process is performed on the workpiece, it is possible to detect an external force applied to the workpiece gripped by the robotic hand by breaking down the external force to six axes. On this account, even when an abnormal external force applied to the workpiece in the middle of the process due to an inappropriate gripping posture of the workpiece is detected, it is possible to more appropriately detect the external force and to take more appropriate measures.

(10) Another aspect of the present disclosure is a usage method of the robotic hand described in (6) or (7). The usage method includes: a gripping step of gripping the workpiece by the abutment gripping portions of the gripping members of the gripping mechanism; an insertion step of inserting the gripped workpiece into an insertion hole of an insertion target workpiece; and a release step of releasing the workpiece inserted into the insertion hole from gripping by the gripping members. The insertion step includes: a moving step of moving the gripping mechanism gripping the workpiece toward the insertion hole of the insertion target workpiece along a hole axis of the insertion hole while an external force applied to the gripping mechanism via the workpiece is detected by the force sensor; an abnormal external force monitoring step of monitoring, in the moving step, whether or not an abnormal external force in the external force becomes larger than a predetermined abnormal external force threshold, the abnormal external force being along a direction different from a direction of an advancing-direction external force, the advancing-direction external force being along a direction reverse to an advancing direction of the gripping mechanism; a moving stop step of temporarily stopping the movement in the moving step when the abnormal external force becomes larger than the abnormal external force threshold; a posture changing step of changing a posture of the workpiece such that, after the movement is stopped in the moving stop step, the bag member of at least one of the bag-shaped actuators constituting the abutment gripping portions abutting with the workpiece is inflated by causing the inside of the bag member to communicate with the high-air-pressure-source communication pipe via the bag-member communication pipe so that, when the movement in the advancing direction is restarted, a magnitude of an abnormal external force applied to the gripping mechanism via the workpiece after the restart becomes smaller than a magnitude of the abnormal external force before the stop; a re-gripping step of gripping the workpiece again by the gripping members; and a restart step of restarting the movement in the advancing direction, the movement being temporarily stopped.

In the usage method of the robotic hand, even in a case where an abnormal external force is applied to the workpiece in the middle of the process due to an inappropriate gripping posture of the workpiece, or the like, when the gripping posture of the workpiece is changed, the workpiece can be appropriately inserted into the insertion hole of the insertion target workpiece. This makes it possible to reduce the case where the workpiece cannot be inserted into the insertion hole.

(11) Alternatively, another aspect of the present disclosure is a usage method of the robotic hand described in (8) or (9). The usage method includes: a gripping step of gripping the workpiece by the abutment gripping portions of the gripping members of the gripping mechanism; an insertion step of inserting the gripped workpiece into an insertion hole of an insertion target workpiece; and a release step of releasing the workpiece inserted into the insertion hole from gripping by the gripping members. The insertion step includes: a moving step of moving the gripping mechanism gripping the workpiece toward the insertion hole of the insertion target workpiece along a hole axis of the insertion hole while an external force applied to the gripping mechanism via the workpiece is detected by the force sensor; an abnormal external force monitoring step of monitoring, in the moving step, whether or not an abnormal external force in the external force becomes larger than a predetermined abnormal external force threshold, the abnormal external force being along a direction different from a direction of an advancing-direction external force, the advancing-direction external force being along a direction reverse to an advancing direction of the gripping mechanism; a moving stop step of temporarily stopping the movement in the moving step when the abnormal external force becomes larger than the abnormal external force threshold; a posture changing step of changing a posture of the workpiece such that, after the movement is stopped in the moving stop step, the bag member of at least one of the bag-shaped actuators constituting the abutment gripping portions or the base-end-side abutment portions abutting with the workpiece is inflated by causing the inside of the bag member to communicate with the high-air-pressure-source communication pipe via the bag-member communication pipe so that, when the movement in the advancing direction is restarted, a magnitude of an abnormal external force applied to the gripping members via the workpiece after the restart becomes smaller than a magnitude of the abnormal external force before the stop; a re-gripping step of gripping the workpiece again by the gripping members; and a restart step of restarting the movement in the advancing direction, the movement being temporarily stopped.

Also in the usage method of the robotic hand, even in a case where an abnormal external force is applied to the workpiece in the middle of the process due to an inappropriate gripping posture of the workpiece, or the like, when the gripping posture of the workpiece is changed, the workpiece can be appropriately inserted into the insertion hole of the insertion target workpiece. This makes it possible to reduce the case where the workpiece cannot be inserted into the insertion hole.

(12) Further, in the usage method described in (11), in the posture changing step, at least any of the bag members constituting the base-end-side abutment portions may be inflated so that the workpiece is moved toward distal end sides of the gripping members provided with the base-end-side abutment portions.

In the usage method of the robotic hand, in the posture changing step, the bag-shaped actuator constituting the base-end-side abutment portion is inflated, so that the workpiece is moved toward a distal end side of the gripping member provided with the base-end-side abutment portion. Hereby, the posture of the workpiece can be more easily changed in some cases so that the magnitude of the abnormal external force after the restart becomes smaller than the magnitude of the abnormal external force before the stop. With such a configuration, the workpiece can be appropriately inserted into the insertion hole of the insertion target workpiece in a wider range, thereby making it possible to further reduce the case where the workpiece cannot be inserted into the insertion hole.

Note that the movement of the workpiece toward the distal end side of the gripping member includes a case where the workpiece is translationally moved toward the distal end side of the gripping member, a case where the workpiece is rotationally moved so that a part, of the workpiece, with which the base-end-side abutment portion abuts is moved toward the distal end side of the gripping member, and a case including both the translational movement and the rotational movement.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment 1

Figure 1:
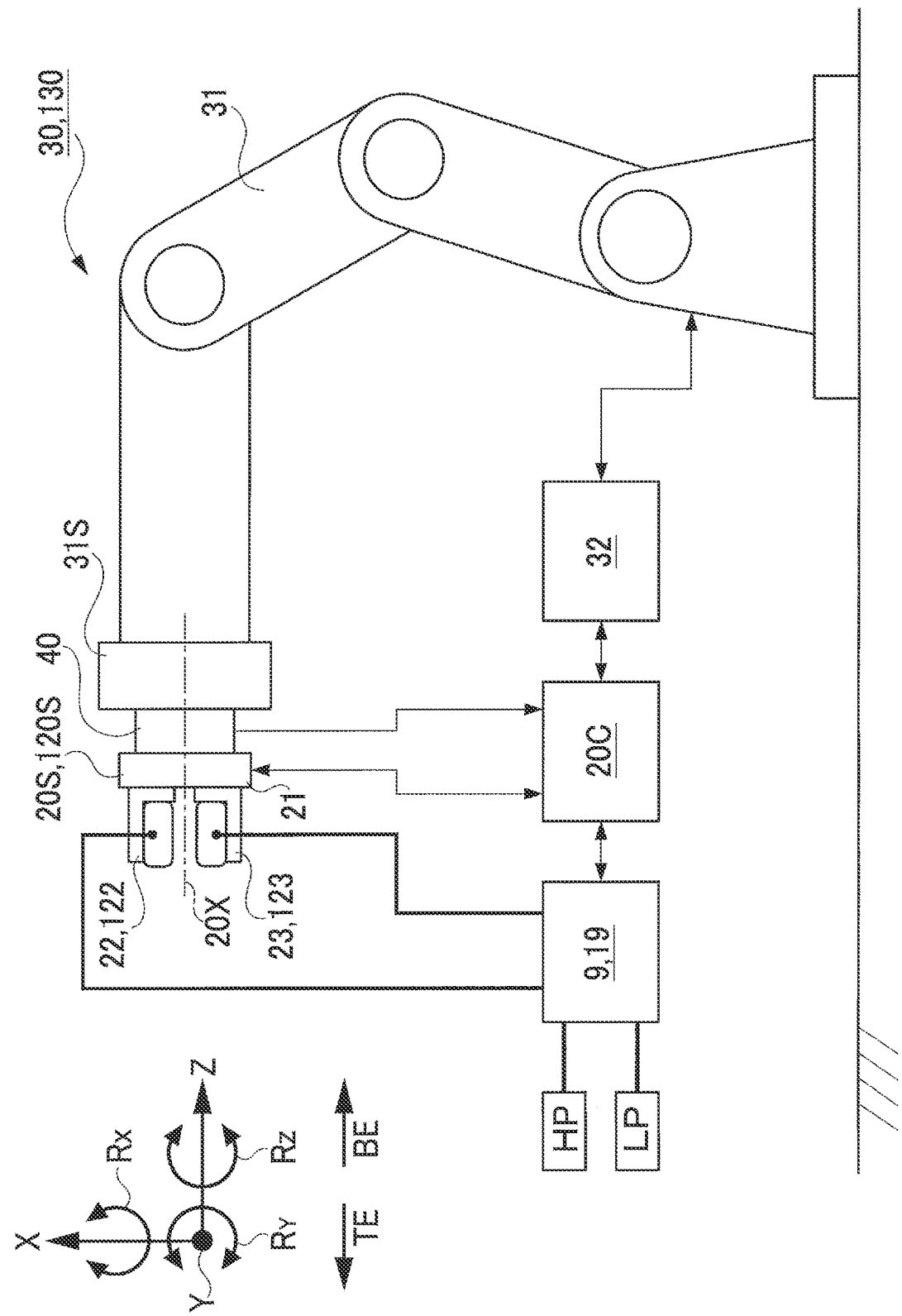
FIG. 1 relates to Embodiments 1, 2 and is an explanatory view illustrating a robotic hand having a distal end portion provided with a chucking mechanism of a chucking device using a bag-shaped actuator system.
Figure 2:
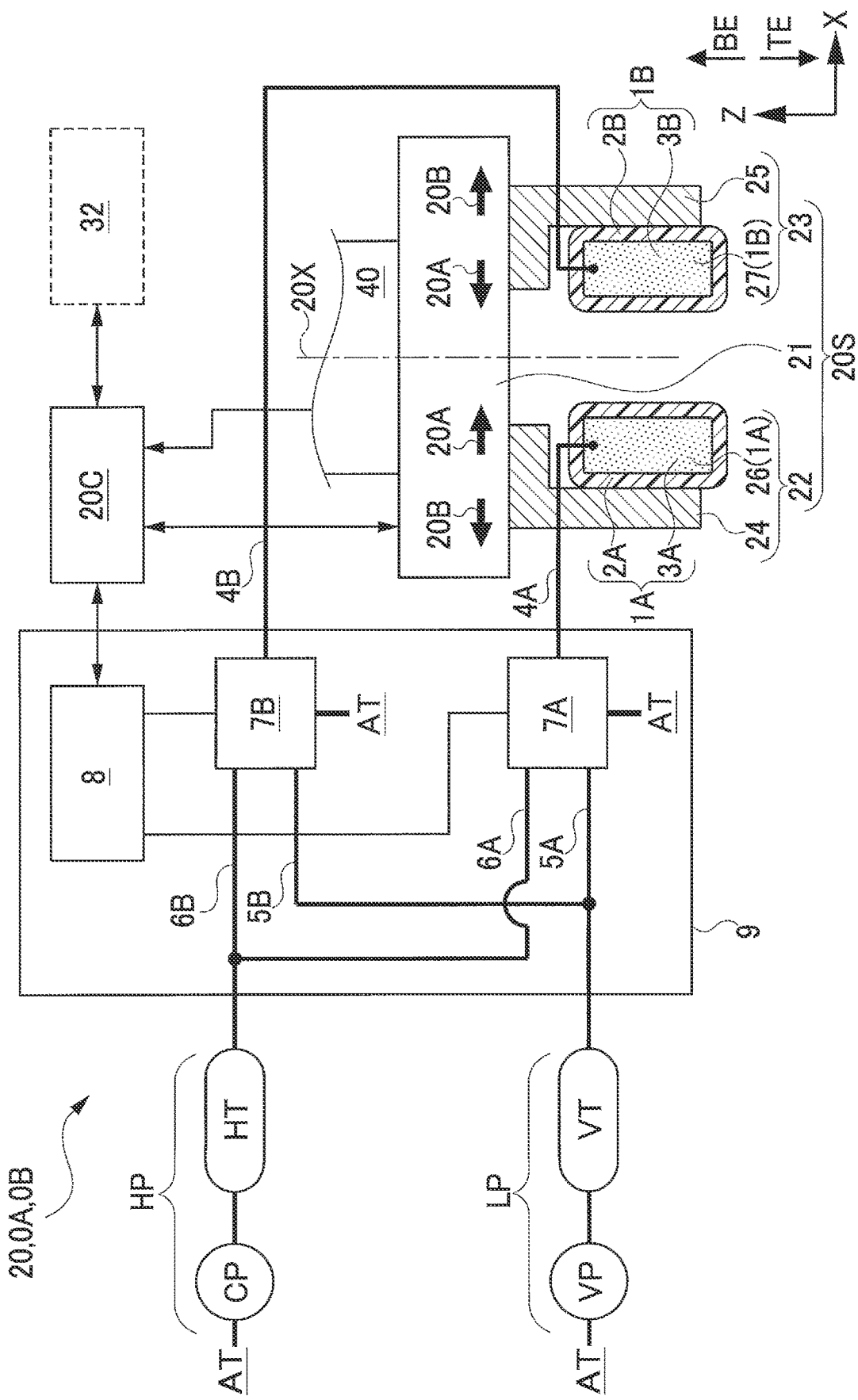
FIG. 2 relates to Embodiment 1 and is an explanatory view of the chucking device using the bag-shaped actuator system.

Referring to FIGS. 1 to 8, the first embodiment of the present disclosure will be described below. FIG. 1 illustrates a robotic hand 30 according to Embodiment 1, and FIG. 2 illustrates a configuration of a chucking device 20 using bag-shaped actuator systems 0A, 0B.

As illustrated in FIG. 1, the robotic hand 30 of Embodiment 1 includes a chucking mechanism 20S of the chucking device 20. The chucking mechanism 20S is provided in a distal end portion 31S (the left side in FIG. 1) of a robotic hand body 31 via a force sensor 40. Among them, the robotic hand body 31 is a so-called articulated robot, and a position and a movement of each part of the robotic hand body 31 are controlled by a robotic hand control device 32. Meanwhile, the chucking mechanism 20S of the chucking device 20 is an electric gripper configured to grip a workpiece (e.g., a first connector C1) as described later.

As illustrated in FIG. 2, the chucking mechanism 20S of the chucking device 20 is constituted by a chuck body portion 21, and one pair of gripping members 22, 23 extending from the chuck body portion 21. The gripping members 22, 23 are configured to be slidably movable in the chuck body portion 21, and operations to grip and release a workpiece are controlled by a chuck controlling portion 20C. Note that, as indicated by arrows in FIG. 2, among the movements of the gripping members 22, 23, directions where the gripping members 22, 23 approach each other are referred to as gripping sides 20A, and directions where the gripping members 22, 23 are distanced from each other are referred to as release sides 20B. That is, when the gripping members 22, 23 are moved toward the gripping sides 20A, the chucking mechanism 20S can grip a workpiece, and when the gripping members 22, 23 are moved toward the release sides 20B, the chucking mechanism 20S can release the workpiece.

The force sensor 40 is a six-axis force sensor that can detect translational forces in three directions of X, Y, and Z that are translational directions and moments in three directions of Rx, Ry, and Rz that are rotation directions around respective axes. In Embodiment 1, as illustrated in FIG. 2, the chucking mechanism 20S is attached to the six-axis force sensor 40 such that a sliding direction of the gripping members 22, 23 is along the X-direction, and a direction along an axis 20X of the chucking mechanism 20S is along the Z-direction. Note that a direction perpendicular to the X-direction and the Z-direction is the Y-direction, a direction rotating around the Z-direction (a Z-axis, the axis 20X of the chucking mechanism 20S) is the Rz-direction, a direction rotating around the X-direction (an X-axis) is the Rx-direction, and a direction rotating around the Y-direction (a Y-axis) is the Ry-direction. A sensor output from the force sensor 40 is input into the chuck controlling portion 20C.

On this account, in a case where, when the gripping members 22, 23 grip a workpiece (e.g., the first connector C1) and perform a predetermined operation, the workpiece thus gripped, the gripping members 22, 23, or the chuck body portion 21 abuts with other members and an abnormal external force is applied to the workpiece, the gripping members 22, 23, or the chuck body portion 21, the force sensor 40 can detect the abnormal external force. Accordingly, when the force sensor 40 detects an abnormal external force, troubleshooting processing on the workpiece can be performed such that the movement of the workpiece by the robotic hand body 31 is stopped, for example. Besides, the force sensor 40 is a six-axis force sensor, and therefore, at the time when a predetermined process is performed on a workpiece, the force sensor 40 can more accurately detect an external force applied to a gripping mechanism via the workpiece or the like by breaking down the external force to respective axes.

The chucking device 20 will be described more specifically with reference to FIG. 2. The gripping members 22, 23 of the chucking mechanism 20S are constituted by respective lug members 24, 25, and respective abutment gripping portions 26, 27. The lug members 24, 25 are made of metal and have an L-shaped section. The lug members 24, 25 are placed to face each other. The abutment gripping portions 26, 27 are provided in the lug members 24, 25. Among them, the lug members 24, 25 include respective base portions 24A, 25A partially supported by the chuck body portion 21, and respective lug portions 24B, 25B extending from the base portions 24A, 25A along the axis 20X. The abutment gripping portions 26, 27 are placed on respective inner sides of the lug portions 24B, 25B. On this account, in a case where a workpiece is gripped by the gripping members 22, 23 of the chucking mechanism 20S, the workpiece is gripped such that the workpiece abuts with the abutment gripping portions 26, 27.

The abutment gripping portions 26, 27 are bag-shaped actuators 1A, 1B in the bag-shaped actuator systems 0A, 0B. The bag-shaped actuators 1A, 1B (the abutment gripping portions 26, 27) are constituted by respective bag members 2A, 2B, and respective particulates 3A, 3B. The bag members 2A, 2B are soft and easily deformable and have airtightness. The particulates 3A, 3B are flowable and filled in the bag members 2A, 2B. In Embodiment 1, the bag members 2A, 2B are made of nitrile rubber (NBR), and the particulates 3A, 3B are made of alumina particles. The bag-shaped actuators 1A, 1B are driven by an actuator control device 9 connected to a low air pressure source LP and a high air pressure source HP.

More specifically, respective insides of the bag members 2A, 2B of the bag-shaped actuators 1A, 1B are connected to respective switching mechanisms 7A, 7B through respective bag-member communication pipes 4A, 4B. The switching mechanisms 7A, 7B are connected to external air AT, to the low air pressure source LP via respective low-air-pressure-source communication pipes 5A, 5B, and to the high air pressure source HP via respective high-air-pressure-source communication pipes 6A, 6B. Based on a control by a switching controlling portion 8, the insides of the bag members 2A, 2B can be switchably connected to the external air AT, the low air pressure source LP, or the high air pressure source HP via respective bag-member communication pipes 4A, 4B. The switching controlling portion 8 is connected to the chuck controlling portion 20C. The switching controlling portion 8 performs driving controls on the robotic hand body 31, the chuck body portion 21, and the bag-shaped actuators 1A, 1B by collaboration of the robotic hand control device 32, the chuck controlling portion 20C, and the switching controlling portion 8, so that the chuck body portion 21 can grip a workpiece appropriately and perform a predetermined operation.

In a case where respective insides of the bag members 2A, 2B of the bag-shaped actuators 1A, 1B communicate with the external air AT through the bag-member communication pipes 4A, 4B, the insides of the bag members 2A, 2B are also equal to an external air pressure (atmospheric pressure), so that the particulates 3A, 3B filled in the bag members 2A, 2B can flow easily. Accordingly, when the workpiece abuts with the bag-shaped actuators 1A, 1B (the bag members 2A, 2B) and a force is applied to the bag-shaped actuators 1A, 1B (the bag members 2A, 2B), the bag members 2A, 2B are easily deformed, so that the particulates 3A, 3B filled in the bag members 2A, 2B flow. That is, the bag members 2A, 2B (the bag-shaped actuators 1A, 1B) enter a soft and easily inelastically deformable state.

In the meantime, when the insides of the bag members 2A, 2B communicate with the low-air-pressure-source communication pipes 5A, 5B through the bag-member communication pipes 4A, 4B, respectively, the insides of the bag members 2A, 2B are depressurized by the low air pressure source LP communicating with the low-air-pressure-source communication pipes 5A, 5B, so that the bag members 2A, 2B are pressed by the atmospheric pressure outside the bag members 2A, 2B. On this account, the particulates 3A, 3B filled in the bag members 2A, 2B are compressed, so that the particulates 3A, 3B make close contact with each other and become hard to flow. As a result, the bag members 2A, 2B (the bag-shaped actuators 1A, 1B) enter a hard and non-deformable state.

In the meantime, when the insides of the bag members 2A, 2B communicate with the high-air-pressure-source communication pipes 6A, 6B through the bag-member communication pipes 4A, 4B, respectively, the bag members 2A, 2B are pressurized from their insides by the high air pressure source HP communicating with the high-air-pressure-source communication pipes 6A, 6B, so that the bag members 2A, 2B are inflated like a balloon. Hereby, the bag members 2A, 2B can be brought into an elastically deformable state. On this account, for example, the workpiece or the like adjacent to the bag members 2A, 2B (the bag-shaped actuators 1A, 1B) can be elastically pressed, or the workpiece or the like with which the bag members 2A, 2B (the bag-shaped actuators 1A, 1B) abut can be moved by pressing forces from the bag members 2A, 2B (the bag-shaped actuators 1A, 1B). Alternatively, the workpiece can be elastically gripped.

As such, the bag-shaped actuator systems 0A, 0B of Embodiment 1 can bring the bag-shaped actuators 1A, 1B into three states, i.e., the "elastically deformable state," the "soft and easily inelastically deformable state," and the "hard and non-deformable state." Note that, in the present embodiment, the low air pressure source LP connected to the low-air-pressure-source communication pipes 5A, 5B is constituted by a vacuum reserve tank VT and a vacuum pump VP connected thereto. Further, the high air pressure source HP connected to the high-air-pressure-source communication pipes 6A, 6B is constituted by a high pressure reserve tank HT and a compressor CP connected thereto. However, the vacuum pump VP may be directly connected to the low-air-pressure-source communication pipes 5A, 5B. Also, the compressor CP may be directly connected to the high-air-pressure-source communication pipes 6A, 6B. Note that, when the vacuum reserve tank VT or the high pressure reserve tank HT is used, there is such an advantage that pressure fluctuation can be restrained. Alternatively, instead of the compressor CP, a high pressure gas cylinder such as a nitrogen gas cylinder may be used.

Further, in the chucking device 20 of Embodiment 1, the abutment gripping portions 26, 27 of the chucking mechanism 20S are constituted by the bag-shaped actuators 1A, 1B of the bag-shaped actuator systems 0A, 0B, so that the abutment gripping portions 26, 27 can achieve the above three states. On this account, in the chucking device 20, the abutment gripping portions 26, 27 can be brought into contact with the first connector C1 to be gripped by selecting a state from the above three states, thereby making it possible to increase the degree of freedom of a gripping state of the first connector C1 and to grip the first connector C1 more appropriately. Besides, in Embodiment 1, the abutment gripping portions 26, 27 are both the bag-shaped actuators 1A, 1B and can select any of the above three states. This further increases the degree of freedom of the gripping state of the first connector C1 by the gripping members 22, 23 and achieves more appropriate gripping of the first connector C1.

Next will be described a workpiece process using the robotic hand 30 including the chucking device 20 with reference to a process of gripping the first connector C1 as a workpiece by the chucking mechanism 20S of the robotic hand 30 and inserting the first connector C1 into an insertion hole C2H of a second connector C2 of an object OJ as an insertion target workpiece (see FIGS. 3, 4, and 5). Note that the object OJ as the insertion target workpiece and the second connector C2 thereof are placed at a predetermined position.

First, in a gripping step S1, a to-be-gripped portion C1G of the first connector C1 is gripped by the gripping members 22, 23 of the chucking mechanism 20S. More specifically, the gripping members 22, 23 are moved to the release sides 20B (outer sides) (step S11), and the insides of the abutment gripping portions 26, 27 (the bag members 2A, 2B) are caused to communicate with the external air AT (step S12). Along with this, the chucking mechanism 20S is moved to a grip position for the first connector C1 (step S13). More specifically, the chucking mechanism 20S is moved by the robotic hand body 31, and the chucking mechanism 20S is positioned so that the to-be-gripped portion C1G of the first connector C1 is placed between two gripping members 22, 23. In this state, the two gripping members 22, 23 are moved to the gripping sides 20A (inner sides), and the to-be-gripped portion C1G of the first connector C1 is sandwiched between the abutment gripping portions 26, 27 until the gripping members 22, 23 cannot move (step S14). Note that, at this point, the insides of the abutment gripping portions 26, 27 communicate with the external air AT, so that the abutment gripping portions 26, 27 easily deform in shapes along the shape of the to-be-gripped portion C1G of the first connector C1 with which the abutment gripping portions 26, 27 abut. This is because the particulates 3A, 3B filled in the bag members 2A, 2B easily flow.

Subsequently, vacuum drawing is performed on the abutment gripping portions 26, 27 (step S15). More specifically, respective communication destinations of the bag-member communication pipes 4A, 4B are switched by the switching mechanisms 7A, 7B, so that the bag-member communication pipes 4A, 4B communicate with the low-air-pressure-source communication pipes 5A, 5B, and respective insides of the bag members 2A, 2B are depressurized by the low air pressure source LP. Hereby, the abutment gripping portions 26, 27 are brought into the hard and non-deformable state while the shapes of the abutment gripping portions 26, 27 generally follow the shape of the to-be-gripped portion C1G of the first connector C1 with which the abutment gripping portions 26, 27 abut. Thus, the chucking mechanism 20S can grip the to-be-gripped portion C1G in the first connector C1 appropriately. Note that FIGS. 3, 4 illustrate a case where the first connector C1 is gripped in a state where an axis C1X of the first connector C1 is along the axis 20X of the chucking mechanism 20S.

After that, the chucking mechanism 20S is moved by the robotic hand body 31 to a predetermined position near the second connector C2 (a moving step S2).

In a subsequent insertion step S3, an insertion portion C1S of the first connector C1 is inserted into the insertion hole C2H of the second connector C2. More specifically, the robotic hand body 31 is driven, so that the chucking mechanism 20S is moved along a direction (an advancing direction PH) along the axis 20X as indicated by a black arrow in FIG. 3. At this time, while the axis 20X of the chucking mechanism 20S is kept along a hole axis C2X of the second connector C2, the insertion portion C1S of the first connector C1 is gradually brought close to the second connector C2 and is inserted into the insertion hole C2H of the second connector C2 (a moving step S31, see FIG. 4). Note that, in Embodiment 1, the advancing direction PH indicated by the black arrow in FIG. 3 is along the Z-direction described above. Further, FIGS. 3, 4 illustrate a case where the axis 20X of the chucking mechanism 20S is along the axis C1X of the first connector C1, so that the axis C1X is also along the hole axis C2X.

When the first connector C1 is inserted, the force sensor 40 detects an external force rf applied to the first connector C1. In view of this, when an external force (an advancing-direction external force) rfz in the advancing direction PH (the Z-direction) that is detected by the force sensor 40 is smaller than a predetermined advancing-direction external force threshold THz (rfz<THz, Yes in step S33), the process returns to the moving step S31, and the insertion of the first connector C1 is continued.

In the meantime, when the advancing-direction external force rfz reaches a magnitude equal to or larger than the advancing-direction external force threshold THz (rfz THz, No in step S33), it is considered that the advancing-direction external force rfz has increased because the first connector C1 is inserted to the dead end of the insertion hole C2H of the second connector C2. In view of this, the process proceeds to a release step S4. Here, the movement of the robotic hand body 31 is stopped, and the gripping members 22, 23 of the chucking mechanism 20S are moved to the release sides 20B, so that the first connector C1 is released from the chucking mechanism 20S. Hereby, the insertion of the first connector C1 into the second connector C2 is completed.

Figure 3:
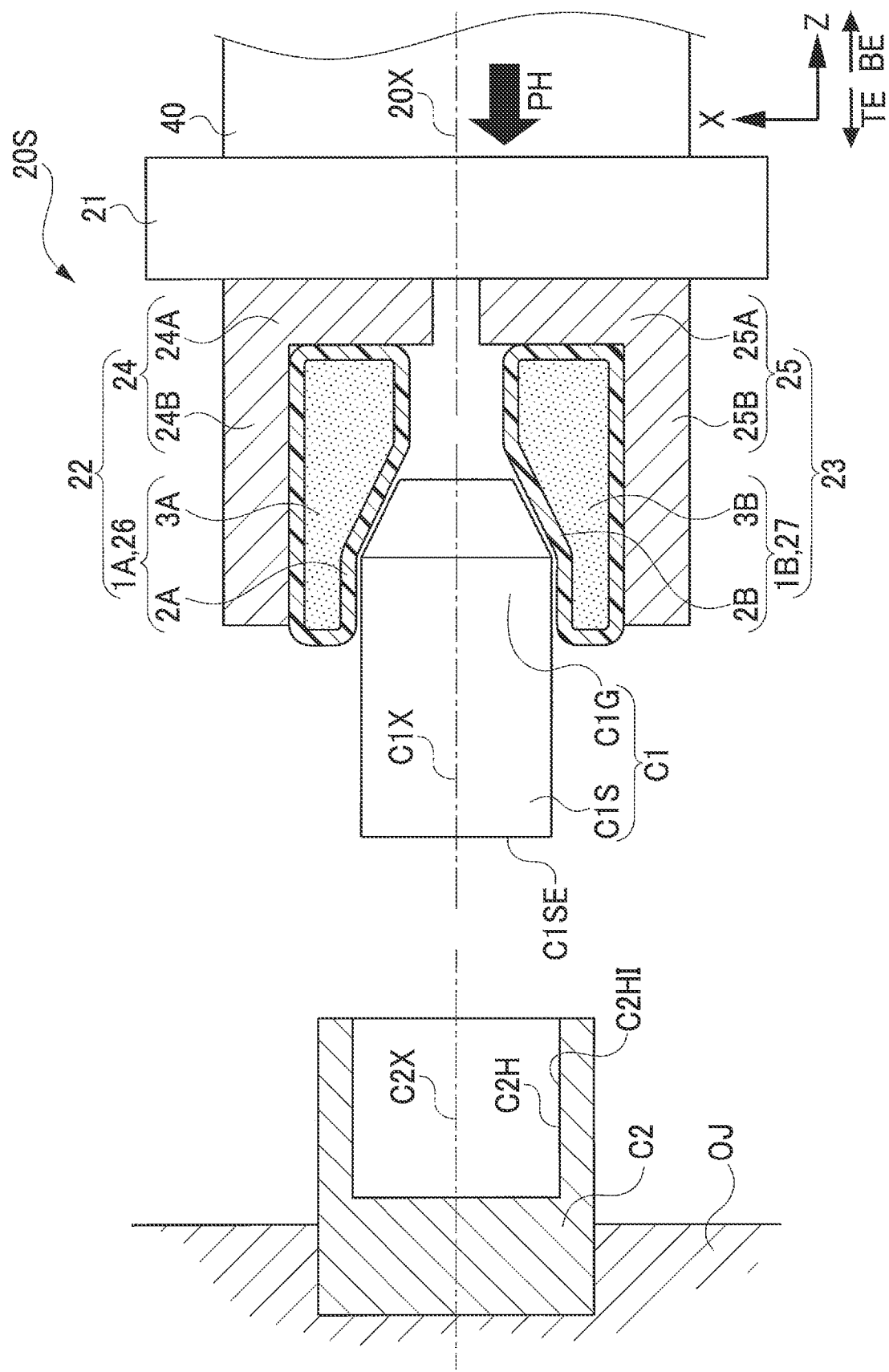
FIG. 3 relates to Embodiment 1 and is an explanatory view illustrating a state before a first connector gripped by the chucking device is inserted into an insertion hole along the axis of a second connector.
Figure 4:
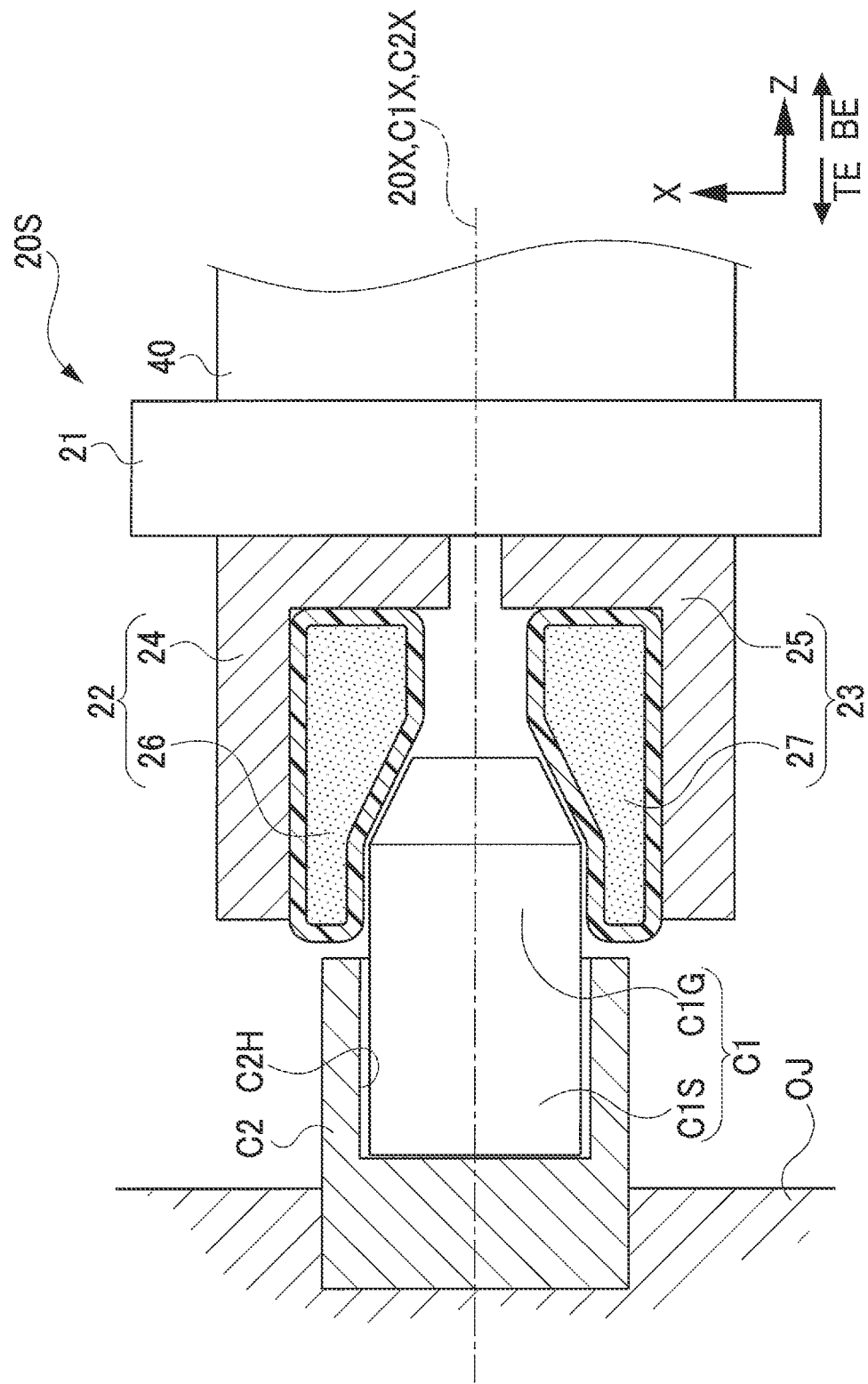
FIG. 4 relates to Embodiment 1 and is an explanatory view illustrating a state after the first connector gripped by the chucking device is inserted into the insertion hole of the second connector.

At the time of the insertion of the first connector C1 into the second connector C2, it is preferable that, as illustrated in FIGS. 3, 4, while a state where the axis C1X of the first connector C1 gripped by the chucking mechanism 20S is along the axis 20X of the chucking mechanism 20S and the axis C1X of the first connector C1 is along the hole axis C2X of the second connector C2 is maintained, the chucking mechanism 20S be moved along the advancing direction PH (the Z-direction) indicated by the black arrow, and the first connector C1 be inserted into the second connector C2. However, when the first connector C1 is gripped by the chucking mechanism 20S, the first connector C1 cannot always be gripped such that the axis C1X of the first connector C1 is along the axis 20X of the chucking mechanism 20S as illustrated in FIG. 3. That is, in some cases, the first connector C1 may be gripped such that the first connector C1 deviates from a predetermined position, or the first connector C1 may be gripped in a state where the axis C1X is inclined. Further, in some cases, the second connector C2 may be placed such that the second connector C2 deviates from a predetermined position, or the second connector C2 may be placed in a state where the hole axis C2X is inclined.

In a case where the postures or the like of the first connector C1 and the second connector C2 are not appropriate as such, even if the first connector C1 is to be inserted into the second connector C2 by the robotic hand body 31 in the insertion step S3 by setting the chucking mechanism 20S along a predetermined locus or in a predetermined posture, the first connector C1 may not be appropriately insertable to the dead end of the insertion hole C2H in some cases. In such cases, such a state often occurs that the insertion portion C1S of the first connector C1 is partially placed inside the insertion hole C2H of the second connector C2, but a distal end peripheral portion C1SE of the insertion portion C1S of the first connector C1 abuts with an inner peripheral surface C2HI of the insertion hole C2H of the second connector C2, so that the first connector C1 is stuck in the insertion hole C2H of the second connector C2 (see FIG. 6).

Further, in this case, it is found that the force sensor 40 detects abnormal external forces in directions (the X-direction and the Y-direction) perpendicular to the advancing direction PH (the Z-direction) as well as the external force (the advancing-direction external force rfz) in the advancing direction PH (the Z-direction), as the external force rf applied to the first connector C1 and so on. Note that, in the present embodiment, for simplification, only an abnormal external force rfx in the X-direction (the sliding direction of the gripping members 22, 23) is taken into consideration as the abnormal external forces in the directions (the X-direction and the Y-direction) perpendicular to the advancing direction PH (the Z-direction).

Further, in the present embodiment, the bag-shaped actuators 1A, 1B are used for the abutment gripping portions 26, 27 of the gripping members 22, 23. On this account, the inventors conceived the following fact. That is, even in a case where the first connector C1 cannot be sufficiently inserted to the dead end of the insertion hole C2H of the second connector C2 in the middle of the insertion step S3 as described above, if the posture of the first connector C1 once gripped by the chucking mechanism 20S can be changed and the insertion in the insertion step S3 is restarted after the posture is changed, the insertion of the first connector C1 into the second connector C2 can be progressed. Further, by repeating the posture change and the restart of the insertion one or more times, the insertion of the first connector C1 into the second connector C2 can be finally completed.

In view of this, in the present embodiment, upon moving the first connector C1 in the moving step S31, an abnormal external force monitoring step S32 is provided. In the abnormal external force monitoring step S32, whether the magnitude (absolute value) |rfx| of the abnormal external force rfx detected by the force sensor 40 is smaller than an abnormal external force threshold THx or not is monitored. Here, in a case where the magnitude |rfx| of the abnormal external force rfx is smaller than the abnormal external force threshold THx (|rfx|<THx), the process proceeds to step S33 described earlier. In the meantime, in a case of No in the abnormal external force monitoring step S32, that is, in a case where the magnitude |rfx| of the abnormal external force rfx is equal to or more than the abnormal external force threshold THx (|rfx|≥THx), the process proceeds to a moving stop step S34, and the movement of the first connector C1 in the advancing direction PH is temporarily stopped. After that, in a posture changing step S35, the posture of the first connector C1 is changed by use of the abutment gripping portions 26, 27 (the bag-shaped actuators 1A, 1B). Then, in a re-gripping step S36, the first connector C1 is gripped again by the gripping members 22, 23. After that, in a restart step S37, the moving step S31 temporarily stopped is restarted, so that the insertion of the first connector C1 is continued. Hereby, the insertion of the first connector C1 into the second connector C2 can be completed.

Note that details of the abnormal external force monitoring step S32, the moving stop step S34, the posture changing step S35, the re-gripping step S36, and the restart step 37 will be described below. In an insertion process in a case where the postures of the first connector C1 and the second connector C2 are appropriate as illustrated in FIGS. 3, 4, that is, in an insertion process in which the first connector C1 is gripped such that the axis 20X of the chucking mechanism 20S is along the axis C1X of the first connector C1, and the chucking mechanism 20S is advanced in the advancing direction PH (the Z-direction) such that the axes 20X, C1X are along the hole axis C2X of the second connector C2, it is difficult to describe the processes from steps S32 to S37.

In view of this, by imitating a case where a gripping posture of the first connector C1 by the chucking mechanism 20S is not appropriate or a case where a placement posture of the second connector C2 is not appropriate, the following separately sets such a case that, in the insertion step S3, while a part of the insertion portion C1S of the first connector C1 is surely placed in the insertion hole C2H of the second connector C2, the distal end peripheral portion C1SE of the insertion portion C1S of the first connector C1 abuts with the inner peripheral surface C2HI of the insertion hole C2H of the second connector C2, so that the first connector C1 is stuck in the insertion hole C2H of the second connector C2. That is, the first connector C1 is gripped such that the axis 20X of the chucking mechanism 20S is along the axis C1X of the first connector C1, and intentionally, the first connector C1 is diagonally inserted into the insertion hole C2H of the second connector C2. That is, the chucking mechanism 20S is moved in the advancing direction PH (the Z-direction) so that the axis 20X of the chucking mechanism 20S diagonally crosses the hole axis C2X of the second connector C2 at an offset angle θ1 (see FIG. 6). A process of changing the gripping posture of the first connector C1 by the chucking mechanism 20S in the insertion step S3 and inserting the first connector C1 into the second connector C2 in such a case will be described below. Note that, even in this case, the gripping step S1, the moving step S2, and the release step S4 are the same, and therefore, descriptions thereof are omitted in the following description.

Figure 5:
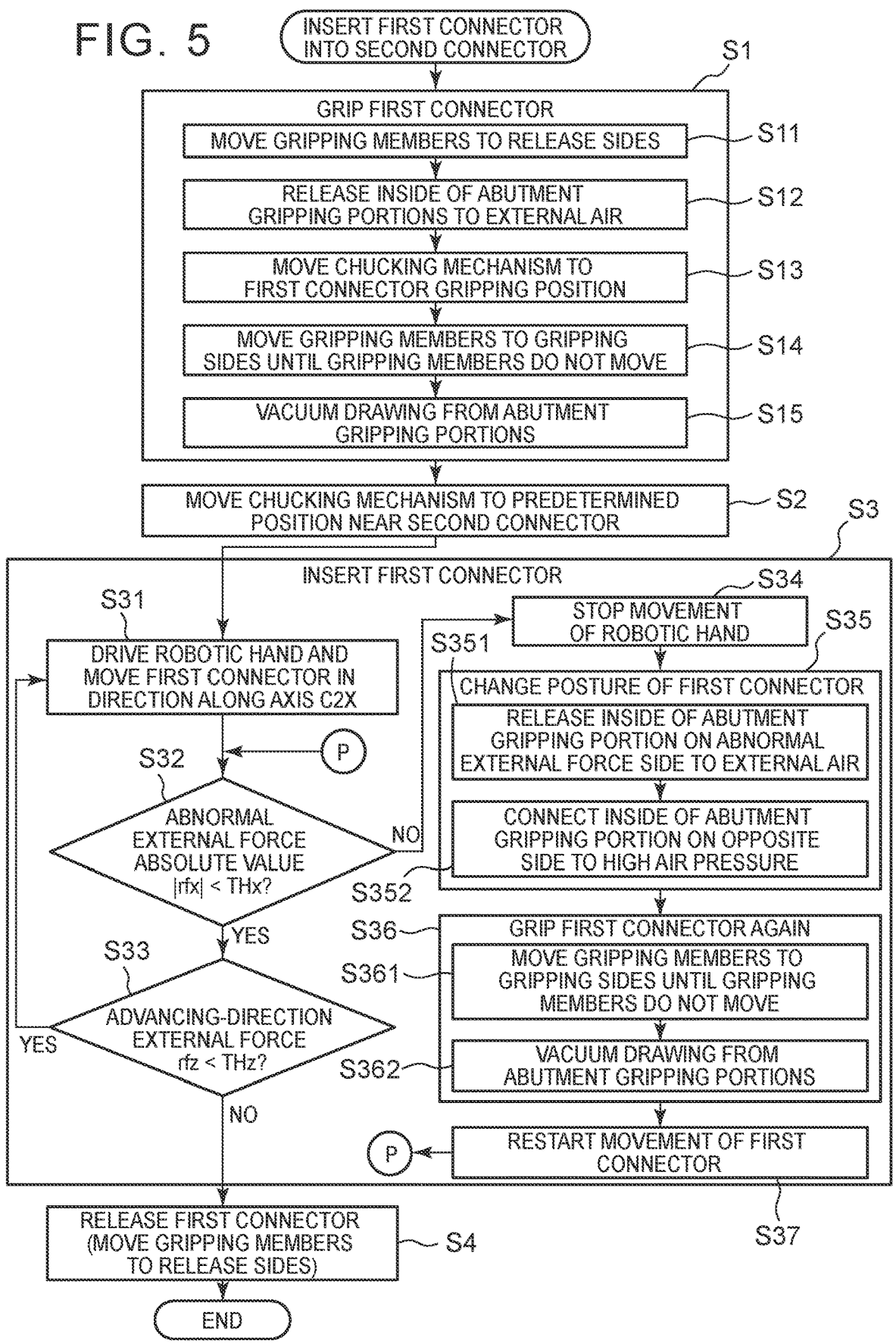
FIG. 5 relates to Embodiment 1 and is a flowchart illustrating the procedure of a process for the robotic hand of gripping the first connector by the chucking device and inserting the first connector into the insertion hole of the second connector.
Figure 6:
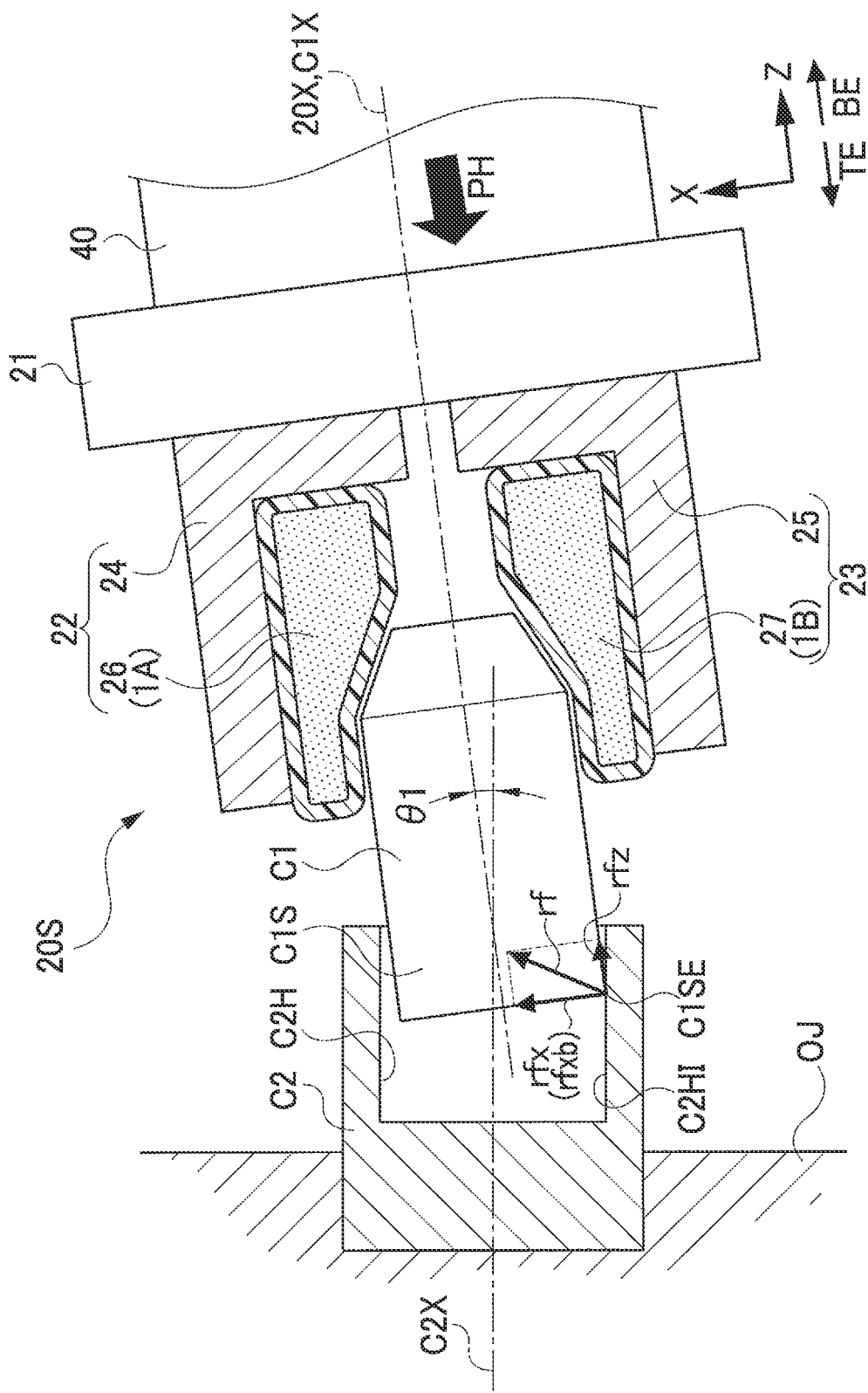
FIG. 6 relates to Embodiment 1 and is an explanatory view illustrating a state where the first connector gripped by the chucking device is inserted into the insertion hole of the second connector in a state where the axis of the chucking mechanism has an offset angle from the axis of the second connector, and the movement of the first connector is stopped due to detection of an abnormal external force.

As described above, in the gripping step S1, the first connector C1 is gripped such that the axis 20X of the chucking mechanism 20S is along the axis C1X of the first connector C1, and then, the chucking mechanism 20S is moved to a position near the second connector C2 (the moving step S2, see FIG. 5). Subsequently, in the moving step S31 in the insertion step S3, the chucking mechanism 20S is advanced in the advancing direction PH indicated by the black arrow. As a result, a part (a lower left corner in FIG. 6) of the distal end peripheral portion C1SE of the first connector C1 abuts with the inner peripheral surface C2HI of the insertion hole C2H of the second connector C2. Hereby, the first connector C1 receives the external force rf as a reaction force from the inner wall surface C2HI of the insertion hole C2H as illustrated in FIG. 6. Note that the external force rf is also transmitted to the chucking mechanism 20S, the force sensor 40, and the robotic hand body 31.

The external force rf is divided into the advancing-direction external force rfz in the advancing direction PH (the Z-direction) and the abnormal external force rfx (an abnormal external force rfxb before stop) in the sliding direction (the X-direction) of the gripping members 22, 23, the sliding direction (the X-direction) being perpendicular to the advancing direction (the Z-direction) as illustrated in FIG. 6. Then, in the abnormal external force monitoring step S32, it is determined whether the magnitude (the absolute value) |rfx| of the abnormal external force rfx is smaller than the abnormal external force threshold THx (|rfx|<THx) or not. Here, in a case of Yes, that is, in a case where the abnormal external force rfx is small, the process proceeds to step S33 described earlier and its subsequent processes are performed. In the meantime, in a case of No, that is, in a case where the magnitude |rfx| of the abnormal external force is equal to or more than the abnormal external force threshold THx (|rfx| THx), the process proceeds to the moving stop step S34, and the movement of the first connector C1 by the robotic hand body 31 in the advancing direction PH is temporarily stopped.

Subsequently, in the posture changing step S35, out of the abutment gripping portions 26, 27 (the bag-shaped actuators 1A, 1B), the inside of the abutment gripping portion (the abutment gripping portion 27 on the lower side in FIG. 7) on a side where the abnormal external force rfx is applied is released to the external air AT. That is, the switching mechanism 7B is switched by the switching controlling portion 8 so that the inside of the bag-shaped actuator 1B communicates with the external air AT (step S351). Hereby, the abutment gripping portion 27 (the bag-shaped actuator 1B) is brought into the soft and easily inelastically deformable state.

Figure 7:
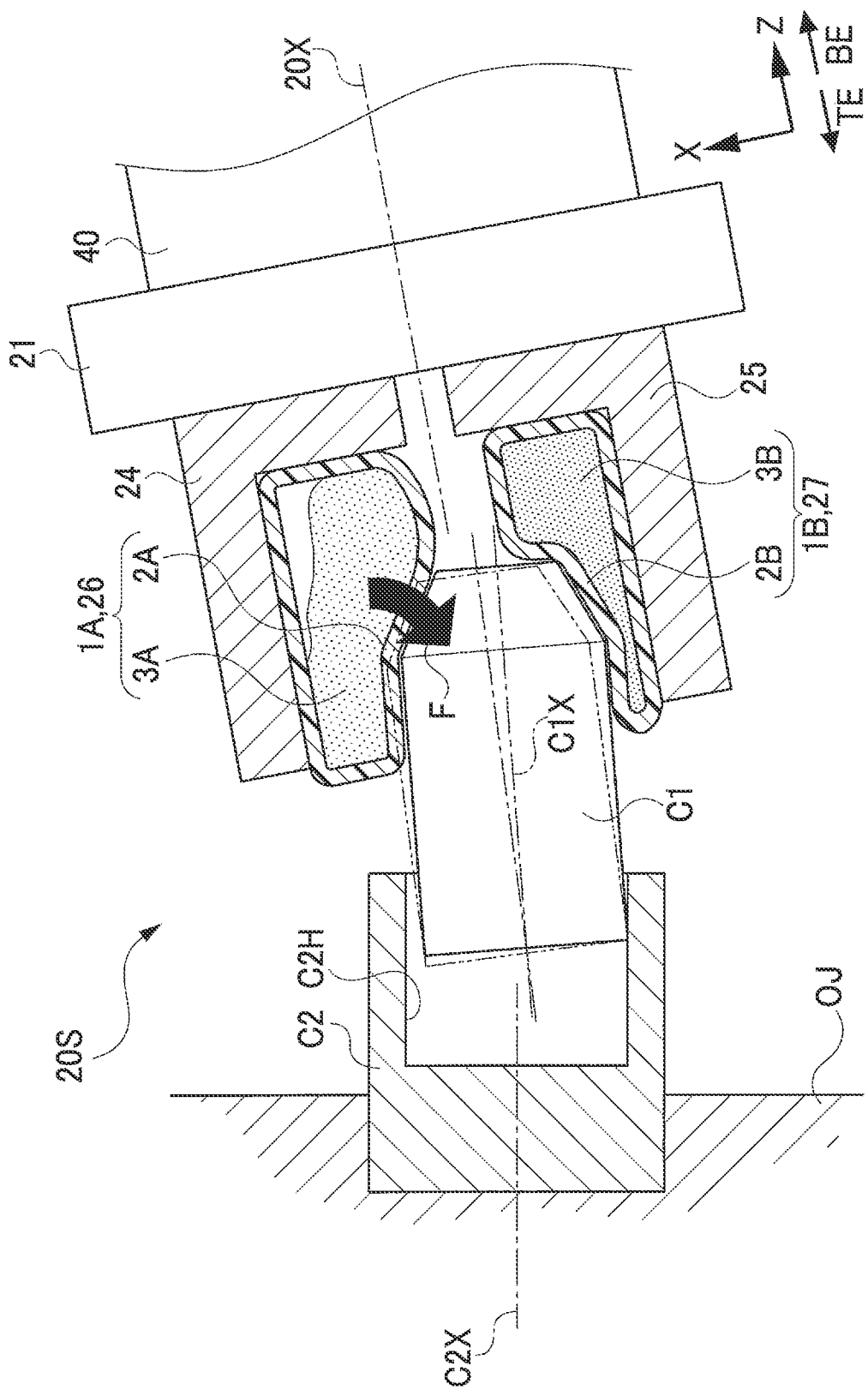
FIG. 7 relates to Embodiment 1 and is an explanatory view illustrating a state where the first connector gripped by the chucking device is pressed and moved by an abutment gripping portion communicating with a high air pressure.

In the meantime, the inside of the abutment gripping portion (the abutment gripping portion 26 on the upper side in FIG. 7) on a side opposite to the side where the abnormal external force rfx is applied is connected to the high air pressure source HP. That is, the switching mechanism 7A is switched by the switching controlling portion 8 so that the inside of the bag-shaped actuator 1A communicates with the high-air-pressure-source communication pipe 6A so as to communicate with the high pressure reserve tank HT (step S352). Hereby, the abutment gripping portion 26 (the bag-shaped actuator 1A) is inflated like a balloon and brought into the elastically deformable state, and as illustrated in FIG. 7, the first connector C1 is pressed by a pressing force F indicated by a black arrow. As a result, the first connector C1 moves from a posture indicated by an alternate long and two short dashes line to a posture indicated by a continuous line, and the abutment gripping portion 27 (the bag-shaped actuator 1B) deforms. Note that, due to the movement of the first connector C1, the axis C1X of the first connector C1 is not along the axis 20X of the chucking mechanism 20S.

Subsequently, the process proceeds to the re-gripping step S36. Herein, the two gripping members 22, 23 are moved to the gripping sides 20A (the inner sides) again, and the to-be-gripped portion C1G of the first connector C1 is sandwiched between the abutment gripping portions 26, 27 until the gripping members 22, 23 cannot move (step S361). Further, the switching mechanisms 7A, 7B are switched by the switching controlling portion 8 so that the abutment gripping portions 26, 27 (the bag-shaped actuators 1A, 1B) communicate again with the low-air-pressure-source communication pipes 5A, 5B, respectively, so as to communicate with a low pressure reserve tank LT (the low air pressure source LP) (step S362). Thus, the first connector C1 with its posture being changed is gripped again by the gripping members 22, 23.

Figure 8:
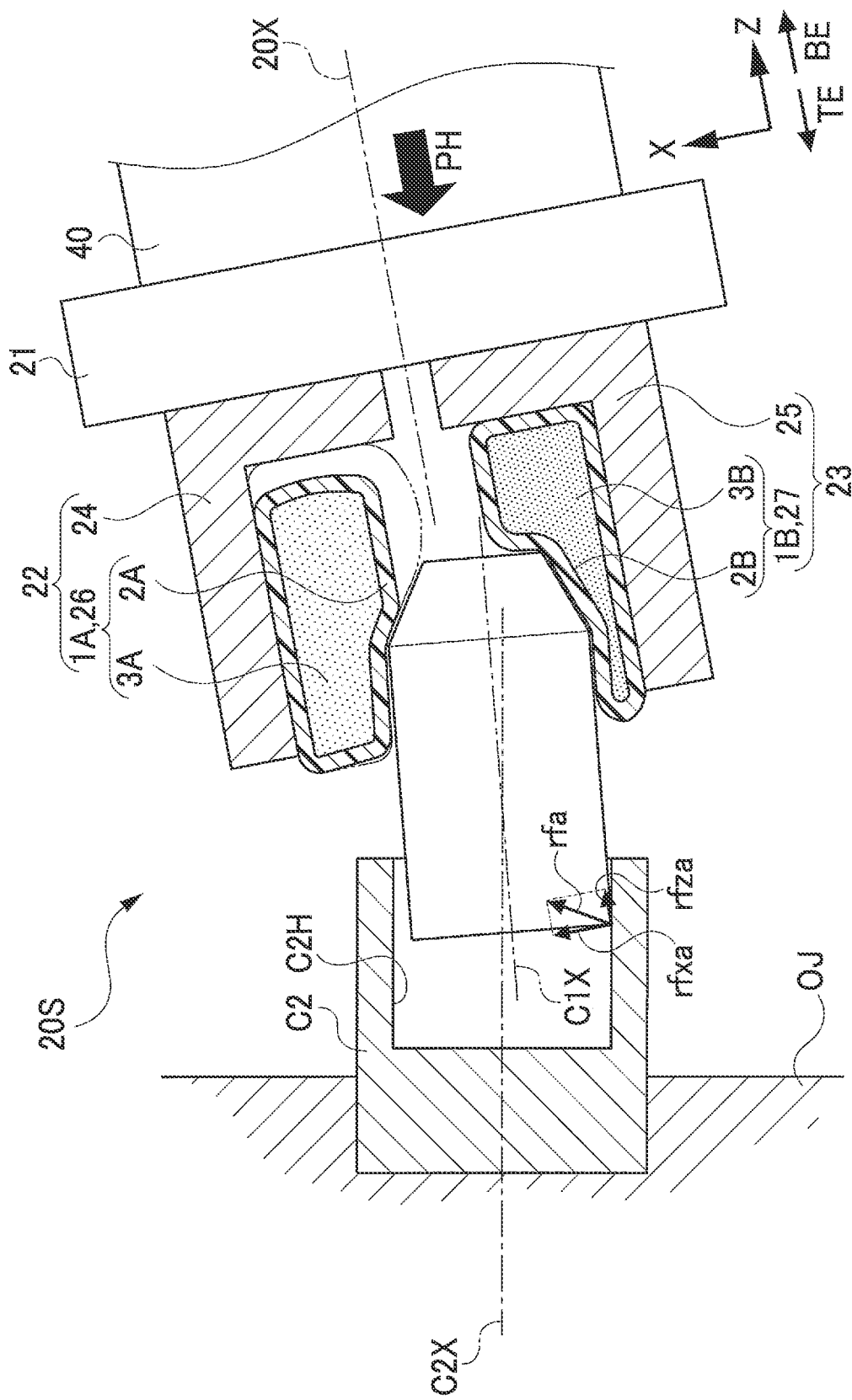
FIG. 8 relates to Embodiment 1 and is an explanatory view illustrating a state where the first connector that has been moved is gripped again by the chucking device and insertion of the first connector into the insertion hole of the second connector is restarted.

Further, in the restart step S37, the moving step S31 temporarily stopped is restarted, and the insertion of the first connector C1 is continued (see FIG. 8). As described above, since the posture of the first connector C1 is changed, an external force rfa, an advancing-direction external force rfza, and an abnormal external force rfxa after the restart can be eliminated (rfa=rfza=rfxa=0) or the abnormal external force rfxa can be reduced as compared to the abnormal external force rfxb before the stop (rfxa<rfxb). After that, steps S31 to S33 are repeated as described above. After a negative determination (No) (rfz≥THz) is made in step S33, the movement of the robotic hand body 31 is stopped, and the gripping members 22, 23 are moved to the release sides 20B, so that the first connector C1 is released from the chucking mechanism 20S (the release step S4). Hereby, the insertion of the first connector C1 into the second connector C2 is completed. Note that, when a negative determination (No) (|rfx|≥THx) is made again in step S32 during repeat of steps S31 to S33, steps S34 to S37 are performed again, so that the insertion is restarted.

Generally, in a case where the offset angle θ1 is sufficiently small (e.g., in a case of θ1=0 to 7.5 deg), the distal end peripheral portion C1SE of the first connector C1 does not abut with the inner peripheral surface C2HI of the insertion hole C2H of the second connector C2, so that the magnitude |rfxa| of the abnormal external force rfxa after the restart is smaller than the abnormal external force threshold THx (|rfxa|<THx). Even if the distal end peripheral portion C1SE of the first connector C1 abuts with the inner peripheral surface C2HI of the insertion hole C2H of the second connector C2, the magnitude |rfxa| of the abnormal external force rfxa after the restart is smaller than the abnormal external force threshold THx (|rfxa|<THx). Accordingly, the insertion of the first connector C1 is continued in step S31 without temporarily stopping the insertion in step S34. Hereby, the insertion of the first connector C1 into the second connector C2 can be completed.

In the meantime, in a case where the offset angle θ1 is large to some extent (e.g., in a case of θ1=7.5 to 18 deg), when the posture of the first connector C1 is changed one to three times (steps S34 to S37 are performed one to three times), the insertion of the first connector C1 in step S31 can be continued, so that the insertion of the first connector C1 into the second connector C2 can be completed.

Note that, in a case where the offset angle θ1 is too large (e.g., θ1≥18 deg), even if the posture of the first connector C1 is repeatedly changed in steps S34 to S37, the insertion of the first connector C1 into the second connector C2 may not be able to be completed.

It is considered that a range of the offset angle θ1 (e.g., 01=7.5 to 18 deg) that can achieve completion of the insertion of the first connector C1 into the second connector C2 by changing the posture about several times (steps S34 to S37) varies depending on the shapes of the first connector C1 and the insertion hole C2H of the second connector C2, the magnitude of a gap between the first connector C1 and the insertion hole C2H, the materials of the connectors, and so on.

Further, as illustrated in FIGS. 3, 4, in a case where the offset angle θ1 formed between the hole axis C2X of the second connector C2 and the axis 20X of the chucking mechanism 20S satisfies 01=0, it is considered that an allowable range of the gripping posture of the first connector C1 by the chucking mechanism 20S and an allowable range of the placement posture of the second connector C2 also vary depending on the shapes of the first connector C1 and the insertion hole C2H of the second connector C2, the magnitude of the gap between the first connector C1 and the insertion hole C2H, the materials of the connectors, and so on. The allowable range of the gripping posture of the first connector C1 by the chucking mechanism 20S and the allowable range of the placement posture of the second connector C2 are ranges that can achieve completion of the insertion of the first connector C1 into the second connector C2 by changing the posture about several times (steps S34 to S37).

However, in any case, with the use of the usage method of the robotic hand 30, even when an abnormal external force is applied to the workpiece in the middle of the process due to an inappropriate gripping posture of the first connector C1 (the workpiece), or the like, the first connector C1 can be appropriately inserted into the insertion hole C2H of the second connector C2 (the insertion target workpiece) by changing the gripping posture of the first connector C1 (a posture changing step S35A). This makes it possible to reduce the case where the first connector C1 cannot be inserted into the insertion hole C2H.

Embodiment 2

Next will be described Embodiment 2 with reference to FIG. 1 and FIGS. 9 to 15. Note that the following mainly describes a part different from Embodiment 1, and a description about a similar part will be omitted or simplified. Further, a similar part has the same reference sign. In a robotic hand 130 according to Embodiment 2, the robotic hand body 31, the robotic hand control device 32, and the force sensor 40 have the same configurations as those in the robotic hand 30 of Embodiment 1 (see FIGS. 1, 2). Further, in a chucking device 120 of Embodiment 2, the chuck body portion 21 of a chucking mechanism 120S and the lug members 24, 25 of gripping members 122, 123 are also the same as the chuck body portion 21 of the chucking mechanism 20S of the chucking device 20 and the lug members 24, 25 of the gripping members 22, 23 in Embodiment 1. Further, similarly to Embodiment 1, as indicated by arrows in FIG. 9, directions where the gripping members 122, 123 come close to each other are referred to as gripping sides 120A where a workpiece is gripped, and directions where the gripping members 122, 123 are distanced from each other are referred to as release sides 120B where the gripped workpiece is released.

Note that, in Embodiment 1, the gripping members 22, 23 each include one abutment gripping portion 26, 27 as the bag-shaped actuator 1A, 1B.

Figure 9:
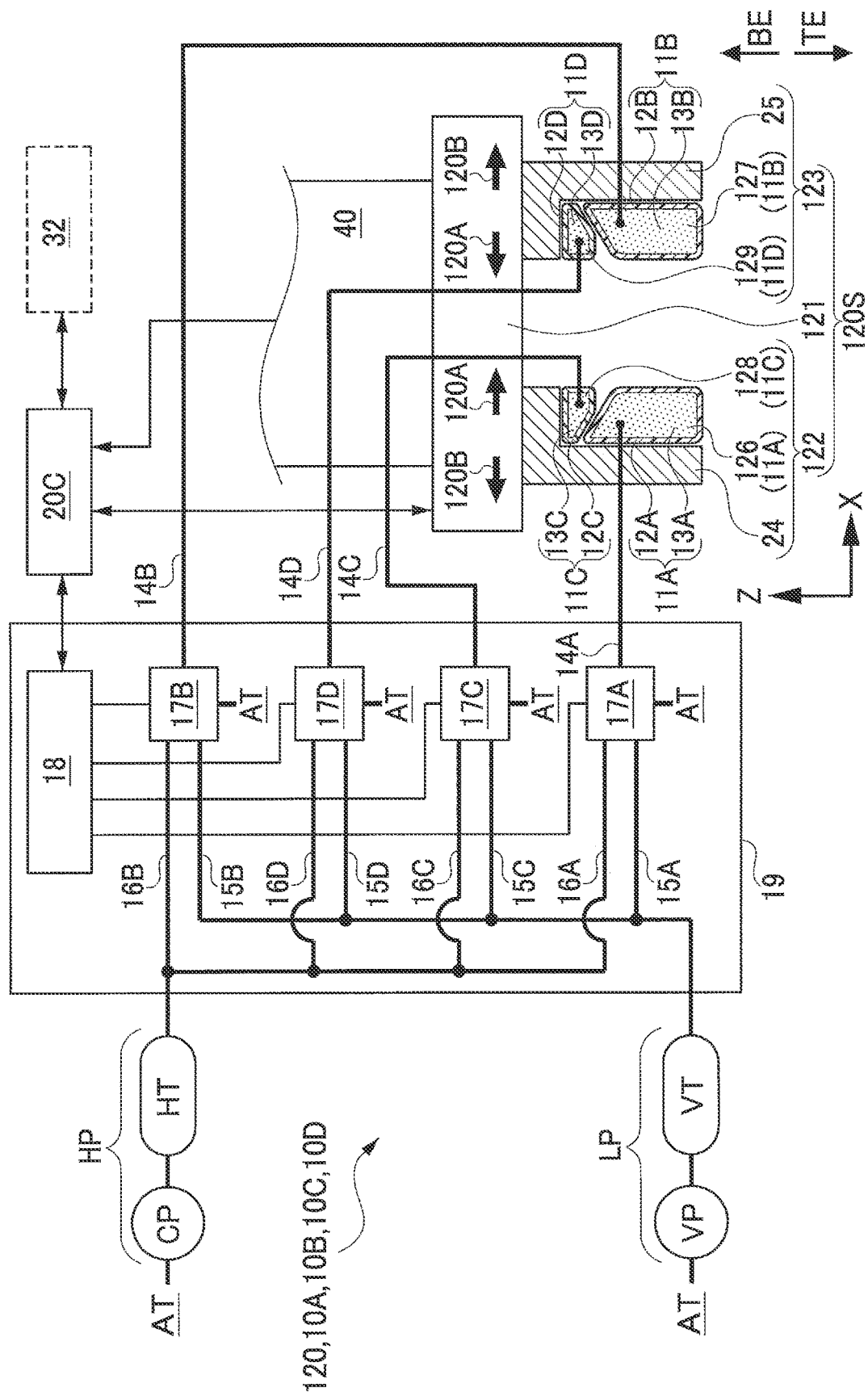
FIG. 9 relates to Embodiment 2 and is an explanatory view of the chucking device using the bag-shaped actuator system.

On the other hand, in the robotic hand 130 of Embodiment 2, the gripping members 122, 123 of the chuck body portion 121 each include one abutment gripping portion 126, 127 and one base-end-side abutment portion 128, 129, as illustrated in FIG. 9. That is, the gripping members 122, 123 include respective abutment gripping portions 126, 127 configured to abut with a workpiece (e.g., the first connector C1) and grip the workpiece in a gripping state, the abutment gripping portions 126, 127 being provided on inner sides of the lug portions 24B, 25B of the lug members 24, 25. In addition to this, the gripping members 122, 123 include respective base-end-side abutment portions 128, 129 configured to abut with the workpiece from base end sides BE of the gripping members 122, 123, the base-end-side abutment portions 128, 129 being provided on distal end sides TE of the base portions 24A, 25A such that the base-end-side abutment portions 128, 129 are placed closer to the base end sides BE than the abutment gripping portions 126, 127.

The abutment gripping portions 126, 127 and the base-end-side abutment portions 128, 129 are bag-shaped actuators 11A to 11D in bag-shaped actuator systems 10A to 10D. Similarly to the bag-shaped actuators 1A, 1B in Embodiment 1, the bag-shaped actuators 11A to 11D are constituted by respective bag members 12A to 12D, and respective particulates 13A to 13D. The bag members 12A to 12D are soft and easily deformable and have airtightness. The particulates 13A to 13D are flowable and filled in the bag members 12A to 12D. Also in Embodiment 2, the bag members 12A to 12D are made of nitrile rubber, and the particulates 13A to 13D are made of alumina particles. Further, the bag-shaped actuators 11A to 11D are driven by an actuator control device 19 connected to the low air pressure source LP and the high air pressure source HP.

More specifically, respective insides of the bag members 12A to 12D of the bag-shaped actuators 11A to 11D are connected to respective switching mechanisms 17A to 17D through bag-member communication pipes 14A to 14D, respectively. The switching mechanisms 17A to 17D are connected to the external air AT, to the low air pressure source LP via respective low-air-pressure-source communication pipes 15A to 15D, and to the high air pressure source HP via respective high-air-pressure-source communication pipes 16A to 16D. Based on a control by a switching controlling portion 18, the insides of the bag members 12A to 12D can be switchably connected to the external air AT, the low air pressure source LP, or the high air pressure source HP via respective bag-member communication pipes 14A to 14D. The switching controlling portion 18 is connected to the chuck controlling portion 20C. The switching controlling portion 18 performs driving controls on the robotic hand body 131, the chuck body portion 121, and the bag-shaped actuators 11A to 11D by collaboration of the robotic hand control device 32, the chuck controlling portion 20C, and the switching controlling portion 8, so that the chuck body portion 121 can grip a workpiece appropriately and perform a predetermined operation.

Note that the bag-shaped actuators 11A to 11D can be brought into three states, i.e., the "elastically deformable state," the "soft and easily inelastically deformable state," and the "hard and non-deformable state" by switching the air pressures inside the bag members 12A to 12D. This is the same as the bag-shaped actuators 1A, 1B in Embodiment 1, and therefore descriptions thereof are omitted.

In the bag-shaped actuator systems 10A to 10D in Embodiment 2, the bag-shaped actuators 11A to 11D can be each brought into three states, i.e., the "elastically deformable state," the "soft and easily inelastically deformable state," and the "hard and non-deformable state."

Further, in the chucking device 120 in Embodiment 2, the abutment gripping portions 126, 127 and the base-end-side abutment portions 128, 129 of the chucking mechanism 120S are constituted by the bag-shaped actuators 11A to 11D in the bag-shaped actuator systems 10A to 10D, so that the abutment gripping portions 126, 127 and the base-end-side abutment portions 128, 129 can achieve the above three states. On this account, even in the chucking device 120, the abutment gripping portions 126, 127 can be brought into contact with the first connector C1 to be gripped by selecting a state from the above three states, thereby making it possible to increase the degree of freedom of a gripping state of the first connector C1 and to grip the first connector C1 more appropriately. In addition, the base-end-side abutment portions 128, 129 are brought into any one of the three states, thereby making it possible to further increase the degree of freedom of the gripping state of the first connector C1 and to achieve more appropriate gripping of the first connector C1.

Besides, the abutment gripping portions 126, 127 and the base-end-side abutment portions 128, 129 are constituted by the bag-shaped actuators 11A to 11D, respectively, and can select any of the above three states. This further increases the degree of freedom of the gripping state of the first connector C1 by the gripping members 122, 123 and achieves more appropriate gripping of the first connector C1.

On this account, in a case where, at the time when the gripping members 122, 123 grip a workpiece (e.g., the first connector C1) and perform a predetermined operation, the gripped workpiece, the gripping members 122, 123, or the chuck body portion 121 abuts with other members, and an abnormal external force is applied to the gripped workpiece, the gripping members 122, 123, or the chuck body portion 121, the force sensor 40 can detect the abnormal external force. Accordingly, when the force sensor 40 detects the abnormal external force, troubleshooting processing on the workpiece can be performed such that the movement of the workpiece by the robotic hand body 131 is stopped, for example. Besides, the force sensor 40 is a six-axis force sensor, and therefore, when a predetermined process is performed on a workpiece, the force sensor 40 can more accurately detect an external force applied to the gripping mechanism via the workpiece or the like by breaking down the external force to respective axes.

Next will be described a workpiece process using the robotic hand 130 with reference to a process of gripping the first connector C1 as the workpiece by the chucking mechanism 120S of the robotic hand 130 and inserting the first connector C1 into the insertion hole C2H of the second connector C2 of the object OJ as the insertion target workpiece, similarly to Embodiment 1 (see FIGS. 10 to 12). Note that the object OJ as the insertion target workpiece and the second connector C2 thereof are placed at a predetermined position.

First, in a gripping step S1A, the to-be-gripped portion C1G of the first connector C1 is gripped by the gripping members 122, 123 of the chucking mechanism 120S. The gripping step S1A is generally similar to the gripping step S1 in Embodiment 1 (steps S11 to S15, see FIG. 5). The gripping step S1A is different from the gripping step S1 in that, instead of step S12, respective insides of the abutment gripping portions 126, 127 and the base-end-side abutment portions 128, 129 (the bag members 12A to 12D) are caused to communicate with the external air AT (step S12A), and instead of step S15, vacuum drawing is performed on the abutment gripping portions 126, 127 and the base-end-side abutment portions 128, 129 (the bag members 12A to 12D) (step S5A). Hereby, the to-be-gripped portion C1G of the first connector C1 can be appropriately gripped by the chucking mechanism 120S. Note that, similarly to FIGS. 3, 4 in Embodiment 1, FIGS. 10, 11 illustrate a case where the first connector C1 is gripped in a state where the axis C1X of the first connector C1 is along an axis 120X of the chucking mechanism 120S.

After that, similarly to Embodiment 1, the chucking mechanism 120S is moved by the robotic hand body 131 to a predetermined position near the second connector C2 (the moving step S2).

In a subsequent insertion step S3A, the insertion portion C1S of the first connector C1 is inserted into the insertion hole C2H of the second connector C2 in a procedure similar to Embodiment 1. More specifically, the robotic hand body 131 is driven so that the chucking mechanism 120S is moved in the advancing direction PH along the axis 120X as indicated by a black arrow in FIG. 10. At this time, while the axis 120X of the chucking mechanism 120S is kept along the hole axis C2X of the second connector C2, the insertion portion C1S of the first connector C1 is gradually brought close to the second connector C2 and is inserted into the insertion hole C2H of the second connector C2 (the moving step S31, see FIG. 11). Also in Embodiment 2, the advancing direction PH is along the Z-direction. Further, FIGS. 10, 11 illustrate a case where the axis 120X of the chucking mechanism 120S is along the axis C1X of the first connector C1, so that the axis C1X is also along the hole axis C2X.

When the insertion portion C1S of the first connector C1 is inserted into the insertion hole C2H of the second connector C2 (No in step S33), the process proceeds to the release step S4, similarly to Embodiment 1. Herein, the movement of the robotic hand body 131 is stopped, and the first connector C1 is released from the chucking mechanism 120S. Hereby, the insertion of the first connector C1 into the second connector C2 is completed.

Note that the insertion step S3A in Embodiment 2 is different from the insertion step S3 in Embodiment 1 in the posture changing step S35A and a re-gripping step S36A, but the other part of the insertion step S3A in Embodiment 2 is similar to the insertion step S3 in Embodiment 1. It is difficult to describe these steps in the states illustrated in FIGS. 10, 11. In view of this, similarly to the description using FIGS. 6 to 8 in Embodiment 1, in Embodiment 2, by imitating a case where the gripping posture of the first connector C1 by the chucking mechanism 120S is not appropriate or a case where the placement posture of the second connector C2 is not appropriate, the chucking mechanism 120S is moved in the advancing direction PH (the Z-direction) so that the axis 120X of the chucking mechanism 120S diagonally crosses the hole axis C2X of the second connector C2 at an offset angle θ2 (see FIG. 6) with reference to FIGS. 13 to 15. The following describes a process of changing the gripping posture of the first connector C1 by the chucking mechanism 120S and inserting the first connector C1 into the second connector C2 in the insertion step S3A in such a case. Note that, even in this case, the gripping step S1A, the moving step S2, and the release step S4 are the same, and therefore, descriptions thereof are omitted in the following description.

Figure 12:
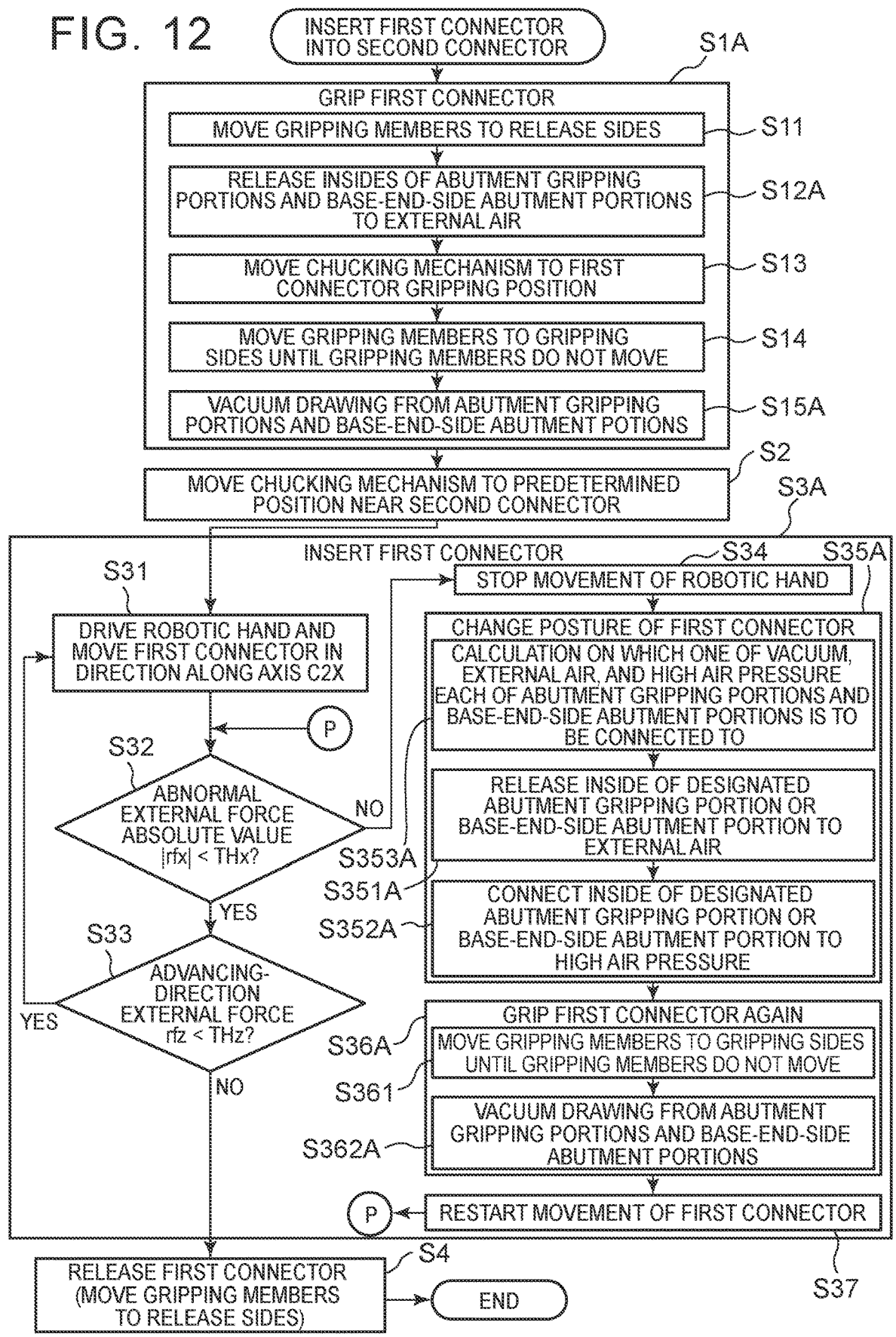
FIG. 12 is a flowchart illustrating the procedure of a process for the robotic hand according to Embodiment 2 of gripping the first connector by the chucking device and inserting the first connector into the insertion hole of the second connector.
Figure 13:
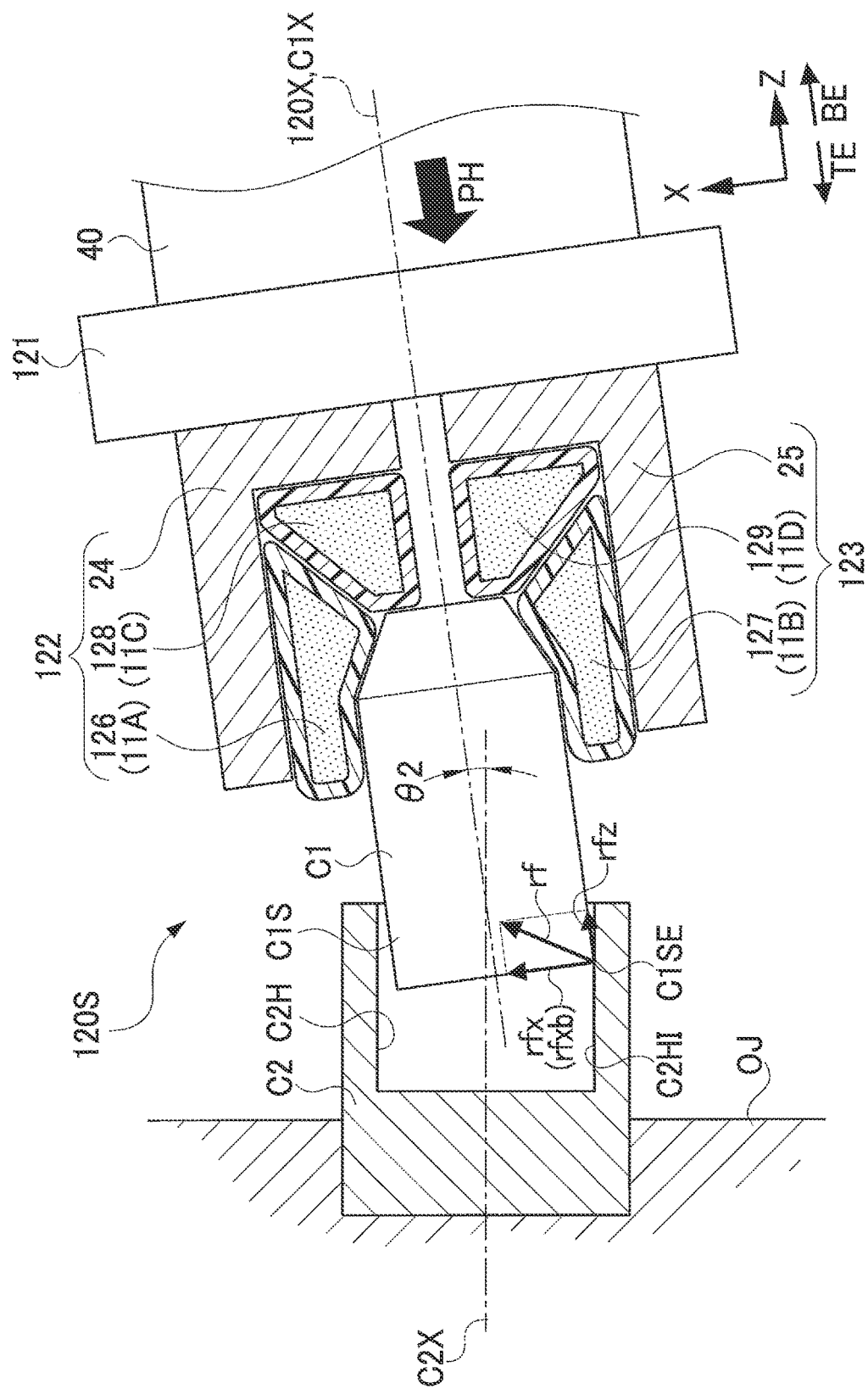
FIG. 13 relates to Embodiment 2 and is an explanatory view illustrating a state where the first connector gripped by the chucking device is inserted into the insertion hole of the second connector in a state where the axis of the chucking mechanism has an offset angle from the axis of the second connector, and the movement of the first connector is stopped due to detection of an abnormal external force.

As described above, in the gripping step S1A, the first connector C1 is gripped such that the axis 120X of the chucking mechanism 120S is along the axis C1X of the first connector C1, and then, the chucking mechanism 120S is moved to a position near the second connector C2 (the moving step S2, see FIG. 12). Subsequently, in the moving step S31 in the insertion step S3A, the chucking mechanism 120S is advanced in the advancing direction PH. As a result, a part (a lower left corner in FIG. 13) of the distal end peripheral portion C1SE of the first connector C1 abuts with the inner peripheral surface C2HI of the insertion hole C2H of the second connector C2. Hereby, the first connector C1 receives the external force rf as a reaction force from the inner wall surface C2HI of the insertion hole C2H as illustrated in FIG. 13. Note that the external force rf is also transmitted to the chucking mechanism 120S, the force sensor 40, and the robotic hand body 131.

Subsequently, in the abnormal external force monitoring step S32, similarly to Embodiment 1, it is determined whether the magnitude |rfx| of the abnormal external force rfx (the abnormal external force rfxb before stop) is smaller than the abnormal external force threshold THx (|rfx|<THx) or not. Here, when the abnormal external force rfx is small (Yes), the process proceeds to step S33 described earlier and its subsequent processes are performed. In the meantime, in a case where the magnitude |rfx| of the abnormal external force is equal to or more than the abnormal external force threshold THx (|rfx|THx) (No), the process proceeds to the moving stop step S34, and the movement of the first connector C1 by the robotic hand body 131 in the advancing direction PH is temporarily stopped.

In the subsequent posture changing step S35A, differently from Embodiment 1, a calculation is made based on a direction, a magnitude, or the like of the abnormal external force rfx so as to find which one of a vacuum, the external air, and the high air pressure respective insides of the abutment gripping portions 126, 127 and the base-end-side abutment portions 128, 129 (the bag-shaped actuators 11A to 11D) are to be connected to (step S353A).

Subsequently, the inside of the abutment gripping portion or the base-end-side abutment portion (the abutment gripping portion 127 on the lower side in FIG. 14) designated in step S353A is released to the external air AT. That is, the switching mechanism 17B is switched by the switching controlling portion 18 so that the inside of the bag-shaped actuator 11B communicates with the external air AT (step S351A). Hereby, the abutment gripping portion 127 (the bag-shaped actuator 11B) is brought into the soft and easily inelastically deformable state.

Figure 14:
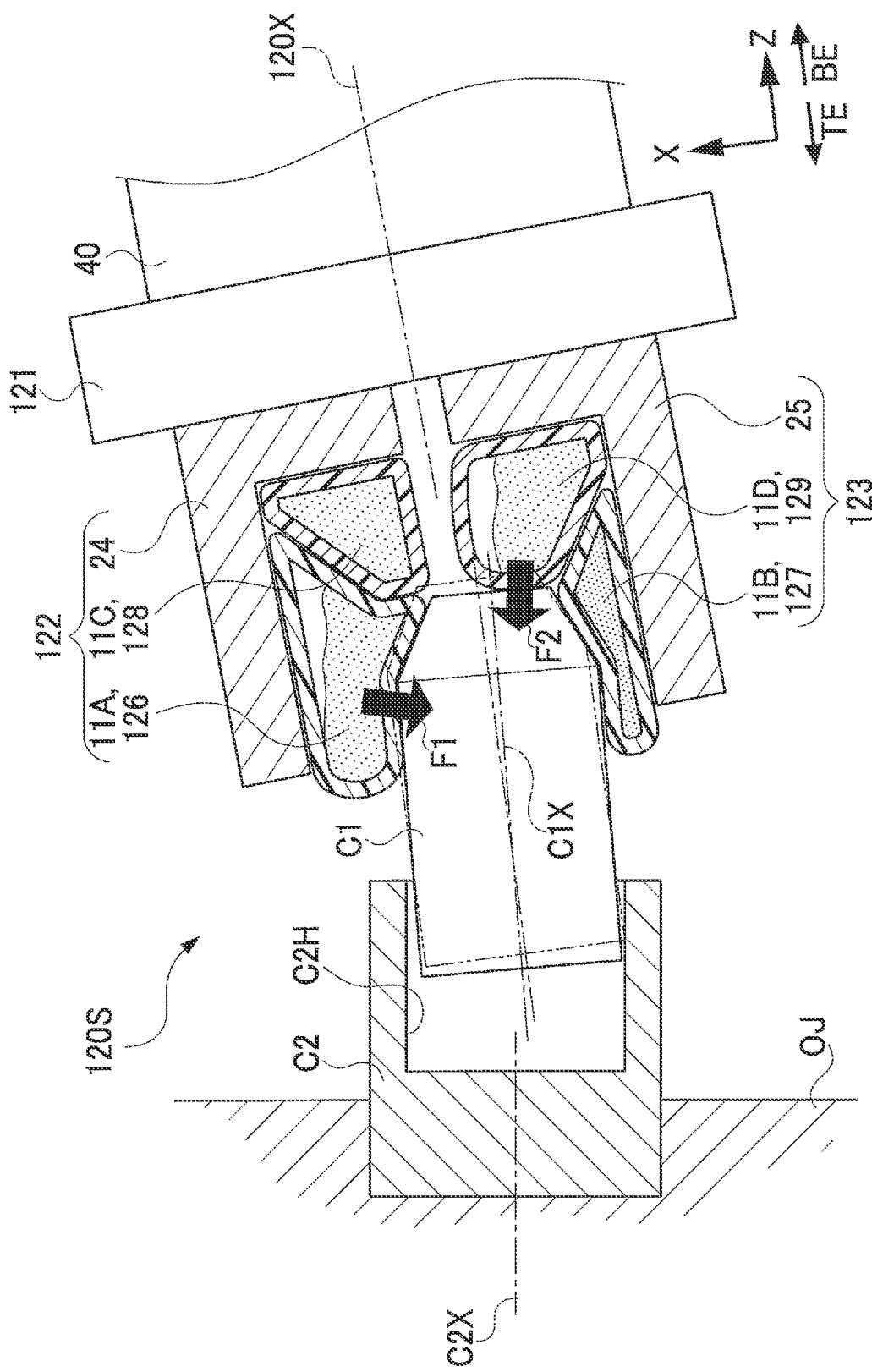
FIG. 14 relates to Embodiment 2 and is an explanatory view illustrating a state where the first connector gripped by the chucking device is pressed and moved by the abutment gripping portion communicating with a high air pressure.

Further, the inside of the abutment gripping portion or the base-end-side abutment portion (the abutment gripping portion 126 on the upper side and the base-end-side abutment portion 129 on the lower side in FIG. 14) designated in step S353A is connected to the high air pressure source HP. That is, the switching mechanisms 17A, 17D are switched by the switching controlling portion 18 so that the insides of the bag-shaped actuator 11A, 11D communicate with the high-air-pressure-source communication pipes 16A, 16D and hereby communicate with the high pressure reserve tank HT (step S352A). The inside of the remaining abutment gripping portion or the remaining base-end-side abutment portion (the base-end-side abutment portion 128 on the upper side in FIG. 14) remains connected to the low air pressure source LP without switching the switching mechanism 17C, that is, remains connected to the vacuum, so that the remaining abutment gripping portion or the remaining base-end-side abutment portion is maintained in the hard and non-deformable state. Hereby, the abutment gripping portion 126 and the base-end-side abutment portion 129 (the bag-shaped actuators 11A, 11D) are inflated like a balloon and brought into the elastically deformable state, and the first connector C1 is pressed by pressing forces F1, F2 so as to rotate clockwise as illustrated in FIG. 14. Hereby, the first connector C1 moves from a posture indicated by an alternate long and two short dashes line to a posture indicated by a continuous line, and the abutment gripping portion 127 (the bag-shaped actuator 11B) deforms. Note that, also in the movement of the first connector C1, the axis C1X of the first connector C1 is not along the axis 120X of the chucking mechanism 120S.

Subsequently, the process proceeds to the re-gripping step S36A, and similarly to Embodiment 1, two gripping members 122, 123 are moved to the gripping sides 120A (the inner sides) again, and the to-be-gripped portion C1G of the first connector C1 is sandwiched between the abutment gripping portions 26, 27 until the gripping members 22, 23 cannot move (step S361). Further, the switching mechanisms 17A, 17B, 17D are switched by the switching controlling portion 18 so that the abutment gripping portions 126, 127 and the base-end-side abutment portions 128, 129 (the bag-shaped actuators 11A to 11D) communicate with the low-air-pressure-source communication pipes 15A to 15D, respectively, and hereby communicate with the low pressure reserve tank LT (the low air pressure source LP) (step S362A). Thus, the first connector C1 with its posture being changed is gripped again by the gripping members 122, 123.

Figure 15:
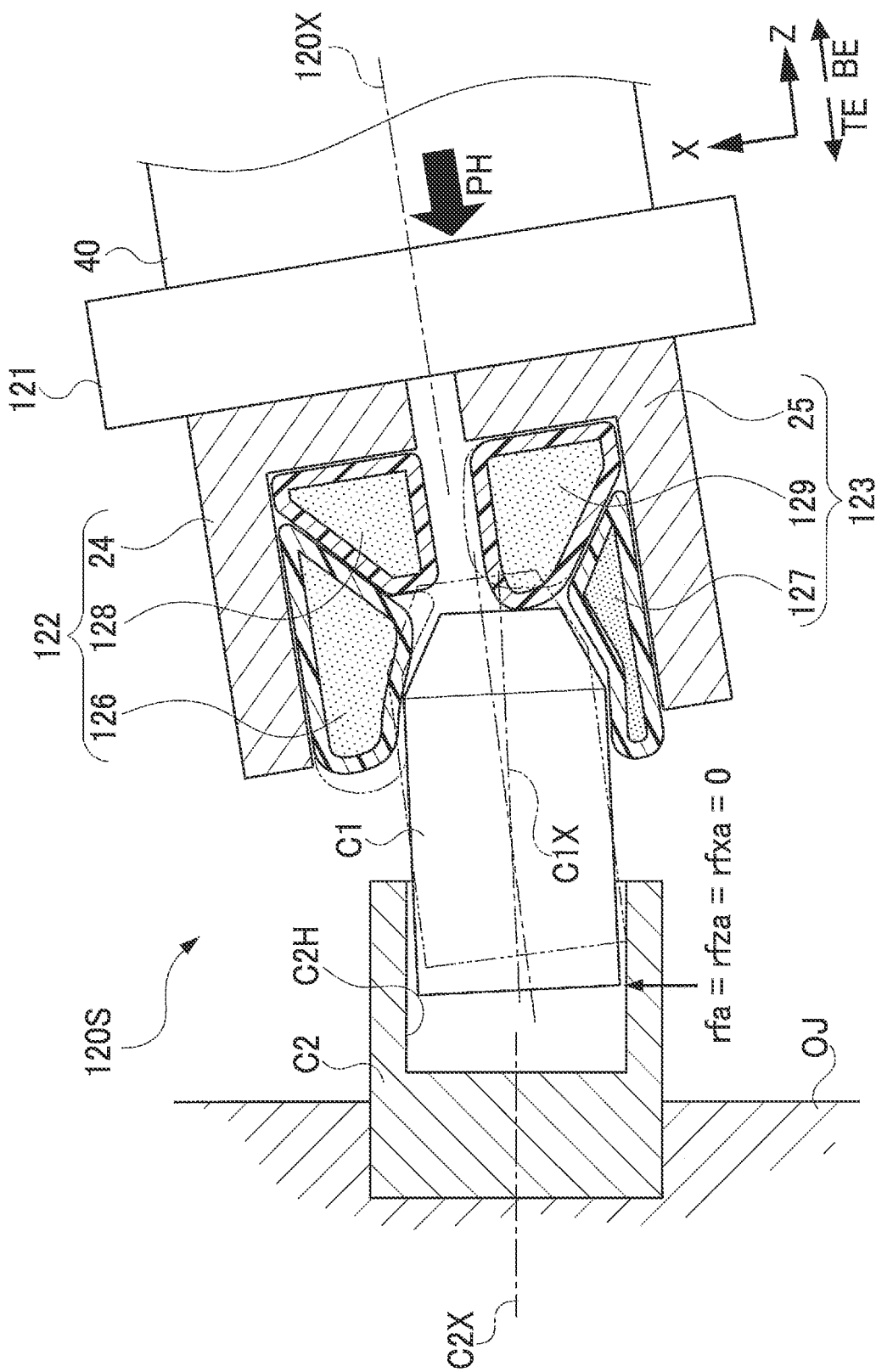
FIG. 15 relates to Embodiment 2 and is an explanatory view illustrating a state where the first connector that has been moved is gripped again by the chucking device and insertion of the first connector into the insertion hole of the second connector is restarted.

After that, similarly to Embodiment 1, in the restart step S37, the moving step S31 temporarily stopped is restarted, and the insertion of the first connector C1 is continued (see FIG. 15). Also in Embodiment 2, since the posture of the first connector C1 is changed as mentioned earlier, the external force rfa, the advancing-direction external force rfza, and the abnormal external force rfxa after the restart can be eliminated (rfa=rfza=rfxa=0) or the abnormal external force rfxa can be reduced as compared to the abnormal external force rfxb before the stop (rfxa<rfxb) (note that FIG. 15 illustrates a case of rfxa=0). Then, steps S31 to S33 are repeated. After a negative determination (No) (rfz≥THz) is made in step S33, the movement of the robotic hand body 131 is stopped, and the gripping members 122, 123 are moved to the release sides 120B, so that the first connector C1 is released from the chucking mechanism 120S (the release step S4). Hereby, the insertion of the first connector C1 into the second connector C2 is completed.

Note that, when a negative determination (No) (|rfx|THx) is made again in step S32 during repeat of steps S31 to S33, steps S34 to S37 are performed again, so that the insertion is restarted.

As compared to a case where the gripping members 22, 23 are provided with only the abutment gripping portions 26, 27 like the robotic hand 30 in Embodiment 1, in a case where the gripping members 122, 123 are provided with respective abutment gripping portions 126, 127 and respective base-end-side abutment portions 128, 129 like the robotic hand 130 in Embodiment 2, the first connector C1 (the workpiece) can be changed into a more appropriate posture. On this account, a range of the offset angle θ2 that can achieve completion of the insertion of the first connector C1 into the second connector C2 by changing the posture about several times (steps S34 to S37, see FIG. 12) can be made wider than the range of the offset angle θ1 in Embodiment 1 (e.g., θ2=7.5 to 28 deg).

Note that, similarly to Embodiment 1, it is considered that this range also varies depending on the shapes of the first connector C1 and the insertion hole C2H of the second connector C2, the magnitude of the gap between the first connector C1 and the insertion hole C2H, the materials of the connectors, and so on.

Figure 10:
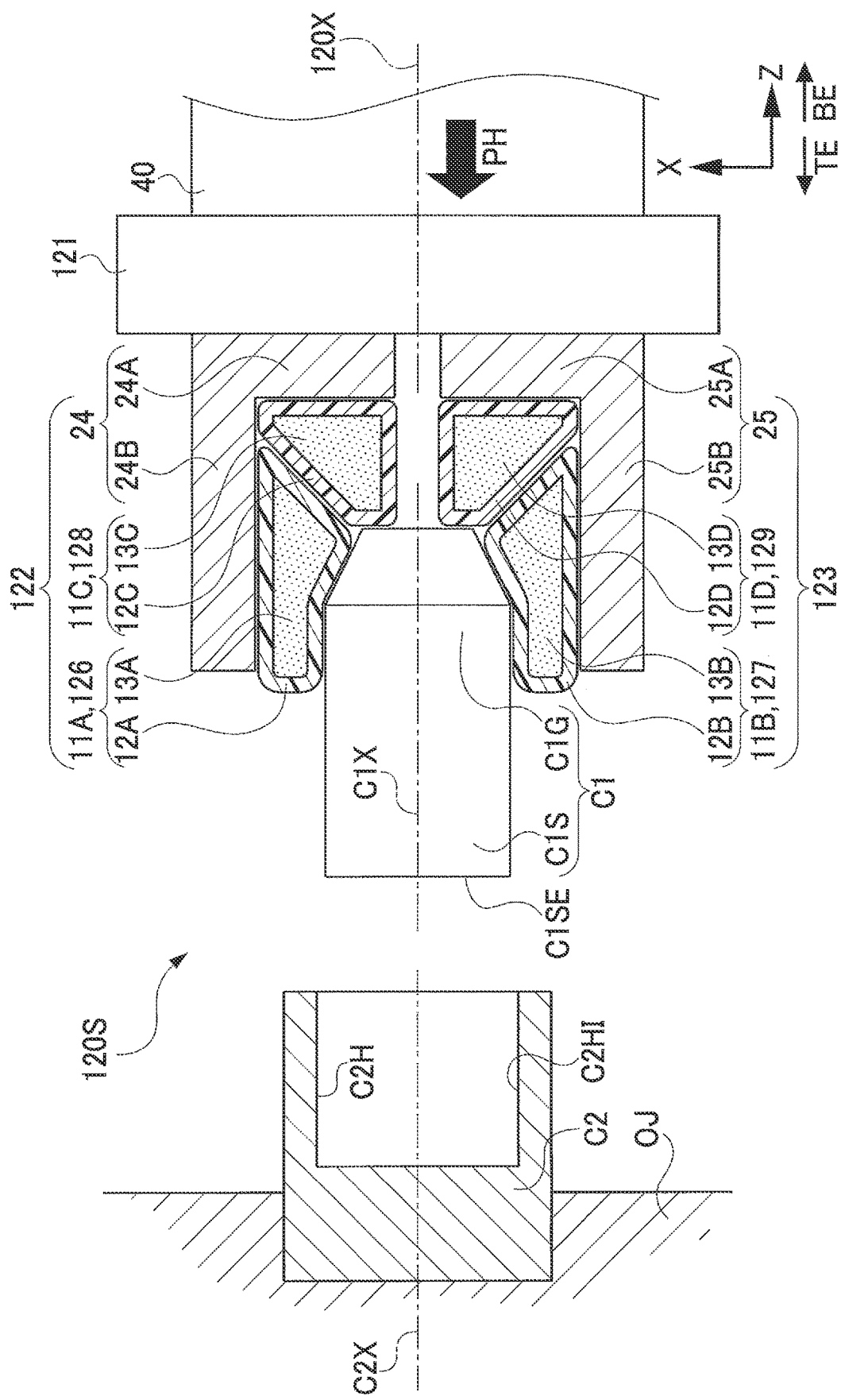
FIG. 10 relates to Embodiment 2 and is an explanatory view illustrating a state before the first connector gripped by the chucking device is inserted into the insertion hole along the axis of the second connector.
Figure 11:
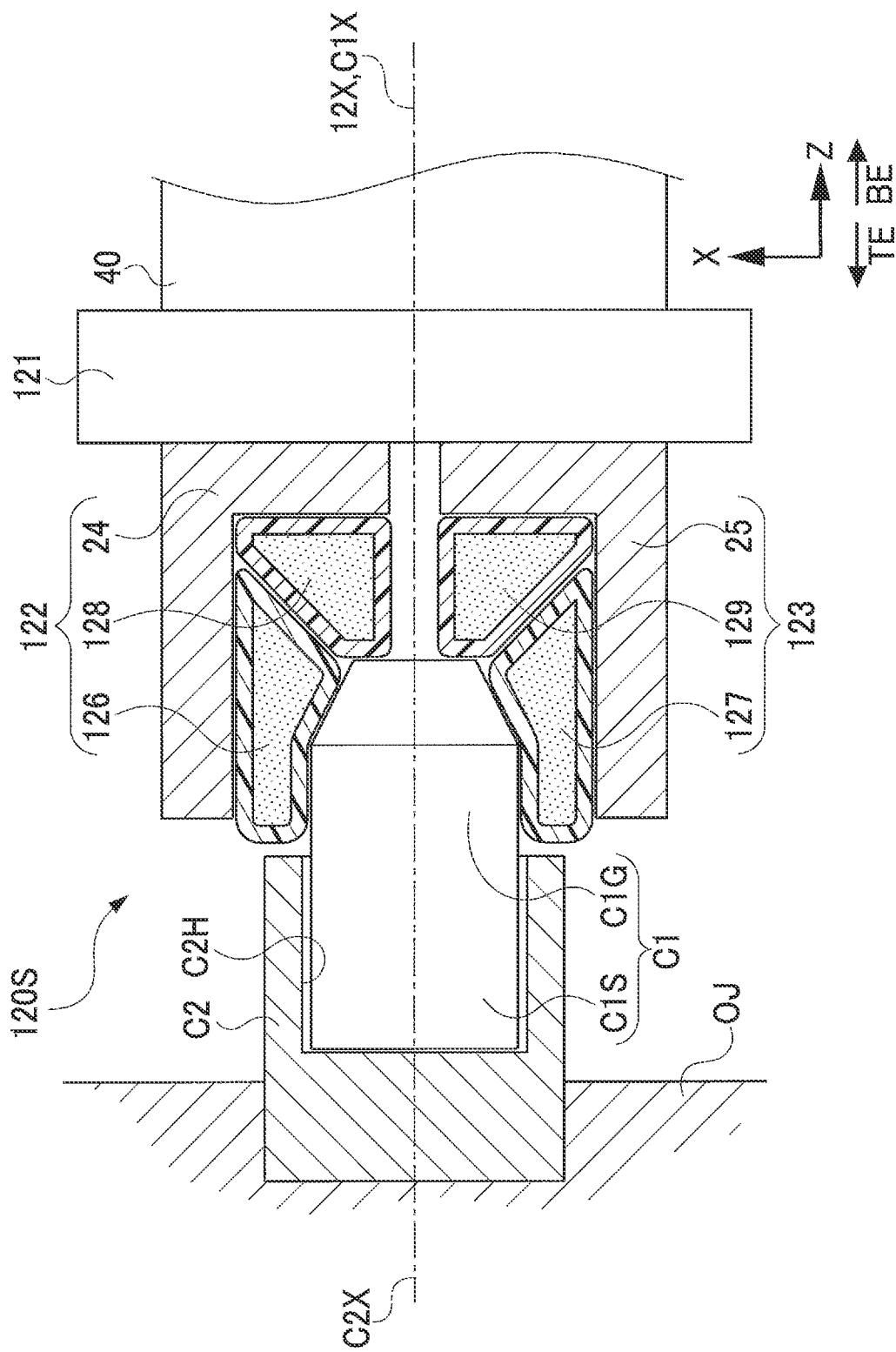
FIG. 11 relates to Embodiment 2 and is an explanatory view illustrating a state after the first connector gripped by the chucking device is inserted into the insertion hole of the second connector.

Further, as illustrated in FIGS. 10, 11, in a case where the offset angle θ2 formed between the hole axis C2X of the second connector C2 and the axis 120X of the chucking mechanism 120S satisfies θ2=0, it is considered that an allowable range of the gripping posture of the first connector C1 by the chucking mechanism 120S and an allowable range of the placement posture of the second connector C2 also vary depending on the shapes of the first connector C1 and the insertion hole C2H of the second connector C2, the magnitude of the gap between the first connector C1 and the insertion hole C2H, the materials of the connectors, and so on. The allowable range of the gripping posture of the first connector C1 by the chucking mechanism 120S and the allowable range of the placement posture of the second connector C2 are ranges that can achieve completion of the insertion of the first connector C1 into the second connector C2 by changing the posture about several times (steps S34 to S37, see FIG. 12), However, in any case, with the use of the usage method of the robotic hand 130 described above, even when an abnormal external force is applied to the workpiece in the middle of the process due to an inappropriate gripping posture of the first connector C1 (the workpiece), or the like, the first connector C1 can be appropriately inserted into the insertion hole C2H of the second connector C2 (the insertion target workpiece) by changing the gripping posture of the first connector C1 (the posture changing step S35A). This makes it possible to reduce the case where the first connector C1 cannot be inserted into the insertion hole C2H.

Besides, in the usage method of the robotic hand 130 in Embodiment 2, in the posture changing step S35A, the bag-shaped actuator 11C constituting the base-end-side abutment portion 128 or the bag-shaped actuator 11D constituting the base-end-side abutment portion 129 are inflated so that the first connector C1 (the workpiece) can be moved to the distal end sides TE of the gripping members 122, 123 provided with the bag-shaped actuators 11C, 11D. Hereby, the posture of the first connector C1 can be changed so that the magnitude |rfx| of the abnormal external force after the restart is smaller than the magnitude of the abnormal external force before the stop. With such a configuration, the first connector C1 can be appropriately inserted into the insertion hole C2H of the second connector C2 (the insertion target workpiece) in a wider range, thereby making it possible to further reduce the case where the first connector C1 cannot be inserted into the insertion hole C2H.

The above description describes the present disclosure based on Embodiments 1, 2. However, the present disclosure is not limited to Embodiments 1, 2 and can be modified and applied appropriately without departing from the gist of the present disclosure.

For example, Embodiments 1, 2 deal with an example in which two lug-shaped gripping members 22, 23, 122, 123 are provided in the chucking mechanism (the gripping device) 20S, 120S so as to grip a workpiece (e.g., the first connector C1). However, three or more gripping members may be provided in the gripping device so as to grip the workpiece.

Further, the embodiments deal with an example in which the abutment gripping portions of a plurality of (two in Embodiments 1, 2) gripping members provided in the gripping device are all constituted by the bag-shaped actuators. However, a gripping device in which any of the abutment gripping portions of the gripping members is not constituted by the bag-shaped actuator may be used.

What is claimed is:

1. A usage method of a robotic hand, the robotic hand comprising:
    a robotic hand body;
    a gripping mechanism; and
    a force sensor configured to detect an external force applied to the gripping mechanism,
    the gripping device comprising:
        a gripping mechanism including a plurality of gripping members, the gripping mechanism being configured to grip a workpiece by moving at least any of the gripping members; and
        at least one bag-shaped actuator system comprising:
            a bag-shaped actuator including an airtight bag member made of a film material having a flexibility, and flowable particulates filled in the bag member;
            a bag-member communication pipe configured to communicate with an inside of the bag member of the bag-shaped actuator;
            a low-air-pressure-source communication pipe configured to communicate with a low air pressure source having an air pressure lower than external air;
            a high-air-pressure-source communication pipe configured to communicate with a high air pressure source having an air pressure higher than the external air;
            a switching mechanism configured to perform switching between communication destinations of the bag member of the bag-shaped actuator such that the inside of the bag member communicates with any of the external air, the low-air-pressure-source communication pipe, and the high-air-pressure-source communication pipe via the bag-member communication pipe; and
            a switching controlling portion configured to control the switching between the communication destinations by the switching mechanism, wherein:
    the gripping members include respective abutment gripping portions configured to grip the workpiece by abutting with the workpiece; and
    at least any of the abutment gripping portions is constituted by the bag-shaped actuator in the bag-shaped actuator system;
    the gripping mechanism being placed in a distal end portion of the robotic hand body;
    the usage method comprising:
        a gripping step of gripping the workpiece by the abutment gripping portions of the gripping members of the gripping mechanism;
        an insertion step of inserting the gripped workpiece into an insertion hole of an insertion target workpiece; and
        a release step of releasing the workpiece inserted into the insertion hole from gripping by the gripping members, wherein the insertion step includes
            a moving step of moving the gripping mechanism gripping the workpiece toward the insertion hole of the insertion target workpiece along a hole axis of the insertion hole while an external force applied to the gripping mechanism via the workpiece is detected by the force sensor,
            an abnormal external force monitoring step of monitoring, in the moving step, whether or not an abnormal external force in the external force becomes larger than a predetermined abnormal external force threshold, the abnormal external force being along a direction different from a direction of an advancing-direction external force, the advancing-direction external force being along a direction reverse to an advancing direction of the gripping mechanism,
            a moving stop step of temporarily stopping a movement in the moving step when the abnormal external force becomes larger than the abnormal external force threshold,
            a posture changing step of changing a posture of the workpiece such that, after the movement is stopped in the moving stop step, the bag member of at least one of the bag-shaped actuators constituting the abutment gripping portions abutting with the workpiece is inflated by causing the inside of the bag member to communicate with the high-air-pressure-source communication pipe via the bag-member communication pipe such that, when the movement in the advancing direction is restarted, a magnitude of an abnormal external force applied to the gripping mechanism via the workpiece after the restart becomes smaller than a magnitude of the abnormal external force before the stop,
            a re-gripping step of gripping the workpiece again by the gripping members, and
            a restart step of restarting the movement in the advancing direction, the movement being temporarily stopped.

2. The usage method according to claim 1, wherein:
    the number of bag-shaped actuator systems provided in the gripping device is equal to or more than the number of gripping members; and
    the abutment gripping portions of the gripping members are constituted by respective bag-shaped actuators of the bag-shaped actuator systems.

3. The usage method according to claim 1, wherein the force sensor is a six-axis force sensor placed between the robotic hand body and the gripping mechanism.

4. A usage method of a robotic hand, the robotic hand comprising:
    a robotic hand body;
    a gripping mechanism placed in a distal end portion of the robotic hand body, and
    a force sensor configured to detect an external force applied to gripping members of the gripping mechanism;
    the gripping mechanism comprising a plurality of gripping members, the gripping mechanism being configured to grip a workpiece by moving at least any of the gripping members;
    a plurality of bag-shaped actuator systems, each bag-shaped actuator system comprising:
        a bag-shaped actuator including an airtight bag member made of a film material having a flexibility, and flowable particulates filled in the bag member;
        a bag-member communication pipe configured to communicate with an inside of the bag member of the bag-shaped actuator;

a low-air-pressure-source communication pipe configured to communicate with a low air pressure source having an air pressure lower than external air;
a high-air-pressure-source communication pipe configured to communicate with a high air pressure source having an air pressure higher than the external air;
a switching mechanism configured to perform switching between communication destinations of the bag member of the bag-shaped actuator such that the inside of the bag member communicates with any of the external air, the low-air-pressure-source communication pipe, and the high-air-pressure-source communication pipe via the bag-member communication pipe; and
a switching controlling portion configured to control the switching between the communication destinations by the switching mechanism;
wherein the gripping members include respective abutment gripping portions configured to grip the workpiece by abutting with the workpiece; and
at least any of the gripping members is configured such that the abutment gripping portion and a base-end-side abutment portion are constituted by respective bag-shaped actuators of the bag-shaped actuator systems, the base-end-side abutment portion being placed closer to a base end side of the at least any of the gripping members than the abutment gripping portion, the base-end-side abutment portion being configured to abut with the workpiece from the base end side of the at least any of the gripping members;
the method comprising:
a gripping step of gripping the workpiece by the abutment gripping portions of the gripping members of the gripping mechanism;
an insertion step of inserting the gripped workpiece into an insertion hole of an insertion target workpiece; and
a release step of releasing the workpiece inserted into the insertion hole from gripping by the gripping members, wherein the insertion step includes
a moving step of moving the gripping mechanism gripping the workpiece toward the insertion hole of the insertion target workpiece along a hole axis of the insertion hole while an external force applied to the gripping mechanism via the workpiece is detected by the force sensor,
an abnormal external force monitoring step of monitoring, in the moving step, whether or not an abnormal external force in the external force becomes larger than a predetermined abnormal external force threshold, the abnormal external force being along a direction different from a direction of an advancing-direction external force, the advancing-direction external force being along a direction reverse to an advancing direction of the gripping mechanism,
a moving stop step of temporarily stopping a movement in the moving step when the abnormal external force becomes larger than the abnormal external force threshold,
a posture changing step of changing a posture of the workpiece such that, after the movement is stopped in the moving stop step, the bag member of at least one of the bag-shaped actuators constituting the abutment gripping portions or the base-end-side abutment portions abutting with the workpiece is inflated by causing the inside of the bag member to communicate with the high-air-pressure-source communication pipe via the bag-member communication pipe such that, when the movement in the advancing direction is restarted, a magnitude of an abnormal external force applied to the gripping members via the workpiece after the restart becomes smaller than a magnitude of the abnormal external force before the stop,
a re-gripping step of gripping the workpiece again by the gripping members, and
a restart step of restarting the movement in the advancing direction, the movement being temporarily stopped.

5. The usage method according to claim 4, wherein:
the number of bag-shaped actuator systems provided in the gripping device is twice or more of the number of gripping members; and
respective abutment gripping portions and respective base-end-side abutment portions of the gripping members are constituted by respective bag-shaped actuators of the bag-shaped actuator systems.

6. The usage method according to claim 4, wherein the force sensor is a six-axis force sensor placed between the robotic hand body and the gripping mechanism.

7. The usage method according to claim 4, wherein, in the posture changing step, at least any of the bag members constituting the base-end-side abutment portions is inflated such that the workpiece is moved toward distal end sides of the gripping members provided with the base-end-side abutment portions.

* * * * *